US008866833B2

(12) United States Patent
Petersen et al.

(10) Patent No.: US 8,866,833 B2
(45) Date of Patent: Oct. 21, 2014

(54) SYSTEM, METHOD, AND COMPUTER PROGRAM PRODUCT FOR PROVIDING A DYNAMIC DISPLAY REFRESH

(71) Applicant: NVIDIA Corporation, Santa Clara, CA (US)

(72) Inventors: Tom Petersen, Santa Clara, CA (US); David Wyatt, San Jose, CA (US); Paul van der Kouwe, San Jose, CA (US); Emmett M. Kilgariff, San Jose, CA (US); Laurence Harrison, San Francisco, CA (US); Jensen Huang, Los Altos Hills, CA (US); Tony Tamasi, San Jose, CA (US); Gerrit A. Slavenburg, Fremont, CA (US); Thomas F. Fox, Palo Alto, CA (US); David Matthew Stears, San Jose, CA (US); Robert Jan Schutten, San Jose, CA (US); Ross Cunniff, Fort Collins, CO (US); Ajay Kamalvanshi, San Jose, CA (US); Robert Osborne, Durham, NC (US); Rouslan Dimitrov, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/024,550

(22) Filed: Sep. 11, 2013

(65) Prior Publication Data

US 2014/0092113 A1 Apr. 3, 2014

Related U.S. Application Data

(63) Continuation of application No. 13/830,847, filed on Mar. 14, 2013.

(60) Provisional application No. 61/709,085, filed on Oct. 2, 2012.

(51) Int. Cl.
*G09G 5/36* (2006.01)
*G06F 13/00* (2006.01)
*G09G 5/00* (2006.01)

(52) U.S. Cl.
CPC .................................... *G09G 5/001* (2013.01)
USPC .......................................... 345/545; 345/537

(58) Field of Classification Search
CPC .......... G09G 5/363; G09G 2340/0435; G09G 2360/18; G09G 5/395; G09G 2310/04; G06T 1/60; G06F 3/14
USPC ............................................. 345/545, 8, 505
See application file for complete search history.

(56) References Cited

U.S. PATENT DOCUMENTS 6,816,163 B2 * 11/2004 Antila .......................... 345/545
7,315,308 B2 1/2008 Wilt et al.

(Continued)

OTHER PUBLICATIONS

Slavenburg, G. A., U.S. Appl. No. 12/901,447, filed Oct. 8, 2010.

(Continued)

*Primary Examiner* — Kee M Tung
*Assistant Examiner* — Nicole Gillespie
(74) *Attorney, Agent, or Firm* — Zilka-Kotab, PC

(57) ABSTRACT

A system, method, and computer program product are provided for a dynamic display refresh. In use, a state of a display device is identified in which an entirety of an image frame is currently displayed by the display device. In response to the identification of the state, it is determined whether an entirety of a next image frame to be displayed has been rendered to memory. The next image frame is transmitted to the display device for display thereof, when it is determined that the entirety of the next image frame to be displayed has been rendered to the memory. Further, a refresh of the display device is delayed, when it is determined that the entirety of the next image frame to be displayed has not been rendered to the memory.

26 Claims, 21 Drawing Sheets

(56) References Cited

U.S. PATENT DOCUMENTS

| | | | | |
|---|---|---|---|---|
| 7,439,981 | B2 | 10/2008 | Wilt et al. | |
| 8,279,138 | B1 | 10/2012 | Margulis | |
| 2003/0071818 | A1 | 4/2003 | Wilt et al. | |
| 2006/0132491 | A1 * | 6/2006 | Riach et al. | 345/505 |
| 2007/0035707 | A1 | 2/2007 | Margulis | |
| 2008/0036696 | A1 | 2/2008 | Slavenburg et al. | |
| 2008/0309674 | A1 | 12/2008 | Barrus et al. | |
| 2011/0012907 | A1 * | 1/2011 | Sakamoto et al. | 345/555 |
| 2011/0279464 | A1 * | 11/2011 | Klask et al. | 345/545 |
| 2012/0320107 | A1 | 12/2012 | Murakami et al. | |

OTHER PUBLICATIONS

Non-Final Office Action from U.S. Appl. No. 13/830,847, dated Aug. 8, 2013.

Final Office Action from U.S. Appl. No. 13/830,847, dated Dec. 16, 2013.

Notice of Allowance from U.S. Appl. No. 13/830,847, dated Mar. 14, 2014.

* cited by examiner

Input: g1, g1, g1, g2, g2, g2

Output: g1, g1, g1, g3, g2, g2 g3 = f(g1, g2, tframe)

SYSTEM, METHOD, AND COMPUTER PROGRAM PRODUCT FOR PROVIDING A DYNAMIC DISPLAY REFRESH

RELATED APPLICATION(S)

The present application is a continuation of U.S. application Ser. No. 13/830,847, filed Mar. 14, 2013, which claims priority to U.S. Provisional Patent Application No. 61/709,085, filed Oct. 2, 2012, all of which are incorporated herein by reference in their entirety.

FIELD OF THE INVENTION

The present invention relates to displaying image frames, and more particularly to display refresh.

BACKGROUND

Conventionally, image frames are rendered to allow display thereof by a display device. For example, a 3-dimensional (3D) virtual world of a video game may be rendered to 2-dimensional (2D) perspective correct image frames. In any case, the time to render each image frame (i.e. the rendering rate of each frame) is variable as a result of such rendering time depending on the number of objects in the scene represented by the image frame, the number of light sources, the camera viewpoint/direction, etc. Unfortunately, the refresh of a display device has generally been independent of the rendering rate, which has resulted in limited schemes being introduced that attempt to compensate for any discrepancies between the differing rendering and display refresh rates.

Just by way of example, a vsync-on mode and a vsync-off mode are techniques that have been introduced to compensate for any discrepancies between the differing rendering and display refresh rates. In practice these modes have been used exclusively for a particular application, as well as in combination where the particular mode selected can be dynamically based on whether the GPU render rate is above or below the display refresh rate. In any case though, vsync-on and vsync-off have exhibited various limitations.

FIG. 1A shows an example of operation when the vsync-on mode is enabled. As shown, an application (e.g. video game) uses a double-buffering approach, in which there are two buffers in memory to receive frames, buffer ‘A’ and ‘B’. In the present example, the display is running at 60 Hz (16.6 mS period). The GPU sends a frame across the cable to the display after the display ‘vertical sync’ (vsync). At time ‘t2’, frame ‘i’ rendering is not yet complete, so the display cannot yet show frame ‘i’. Instead the GPU sends frame ‘i−1’ again to the display. Shortly after ‘t2’, the GPU is done rendering frame ‘i’. The GPU goes into a wait state, since there is no free buffer to render an image into, namely buffer B is in use by the display to scan out pixels, and buffer A is filled and waiting to be displayed. Just before ‘t3’ the display is done scanning out all pixels, and buffer B is free, and the GPU can start rendering frame ‘i+1’ into buffer B. At ‘t3’ the GPU can start sending frame ‘i’ to the display.

Note that when the rendering of a frame completes just after vsync, this can cause an extra 15 mS to be added before the frame is first displayed. This adds to the ‘latency’ of the application, in particular the time between a user action such as a ‘mouse click’, and the visible response on the screen, such as a ‘muzzle flash’ from the gun. A further disadvantage of ‘vsync-on’ is that if the GPU rendering happens to be slightly slower than 60 Hz, the effective refresh rate will drop down to 30 Hz, because each image is shown twice. Some applications allow the use of ‘triple buffering’ with ‘vsync-on’ to prevent this 30 Hz issue from occurring. Because the GPU never needs to wait for a buffer to become available in this particular case, the 30 Hz refresh issue is avoided. However, the display pattern of ‘new’, ‘repeat’, ‘new’, ‘new’, ‘repeat’ can make motion appear irregular. Moreover, when the GPU renders much faster than display, triple buffering actually leads to increased latency of the application running on the GPU.

FIG. 1B shows an example of operation when the vsync-off mode is enabled. As shown, in the present example the display is again running at 60 Hz. In the vsync-off case, the GPU starts sending the pixels of a frame to the display as soon as the rendering of the frame completes, and abandons sending the pixels from the earlier frame. This immediately frees the buffer in use by the display and the GPU need not wait to start rendering the next frame. The advantage of vsync-off is lower latency, and faster rendering (no GPU wait). One disadvantage of ‘vsync-off’ is so called ‘tearing’, where the screen shown to the user contains a horizontal ‘tear line’ where the newly available rendered frame begins being written to the display due to object motion that puts objects of the earlier frame in a different position in the new frame. The tear line is especially noticeable when objects in the rendered scene are moving (or the scene is being panned) and part of an image of an object is above the tear line and part of the image of the object is below the tear line. In this case the object appears to be torn—the top of the object is in the wrong position relative to the bottom of the object. In this context, “tearing” is similar to the word “ripping” and not the word “weeping”.

There is thus a need for addressing these and/or other issues associated with the prior art.

SUMMARY

A system, method, and computer program product are provided for a dynamic display refresh. In use, a state of a display device is identified in which an entirety of an image frame is currently displayed by the display device. In response to the identification of the state, it is determined whether an entirety of a next image frame to be displayed has been rendered to memory. The next image frame is transmitted to the display device for display thereof, when it is determined that the entirety of the next image frame to be displayed has been rendered to the memory. Further, a refresh of the display device is delayed, when it is determined that the entirety of the next image frame to be displayed has not been rendered to the memory.

DETAILED DESCRIPTION

Figure 1A:
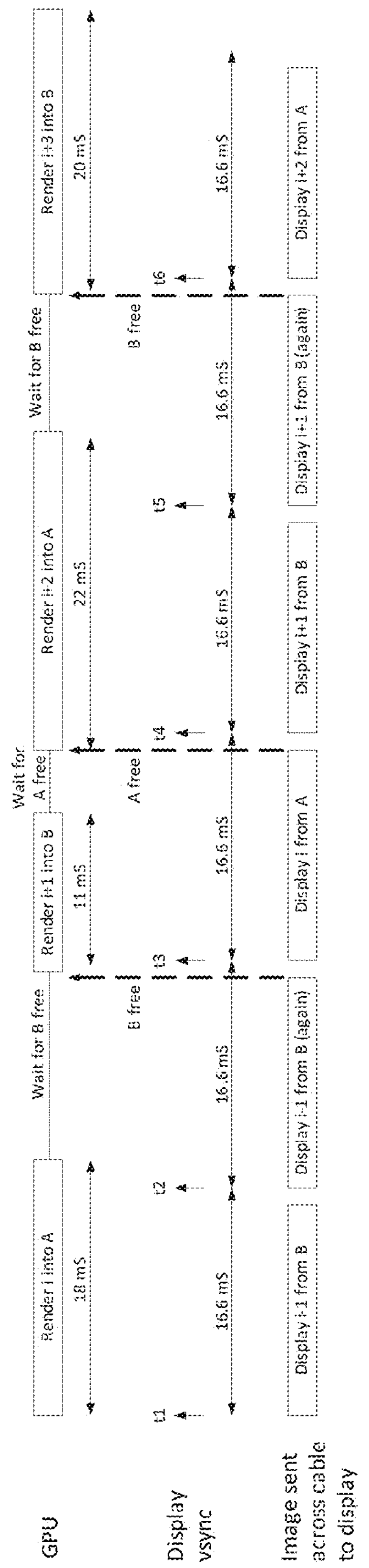
FIGURE 1A (Prior Art)
FIG. 1A shows a timing diagram relating to operation of a system when a vsync-on mode is enabled, in accordance with the prior art.
Figure 1B:
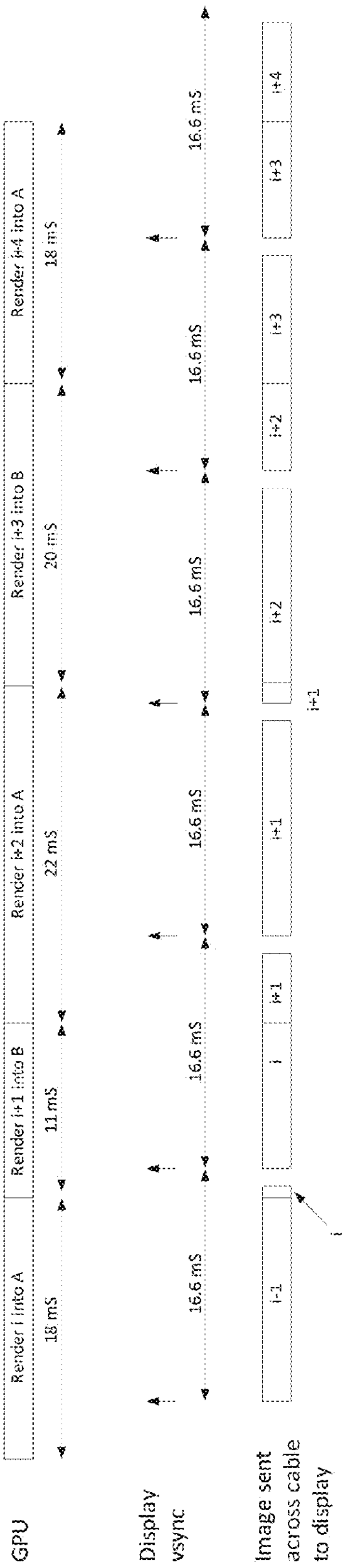
FIGURE 1B (Prior Art)
FIG. 1B shows a timing diagram relating to operation of a system when a vsync-off mode is enabled, in accordance with the prior art.
Figure 2:
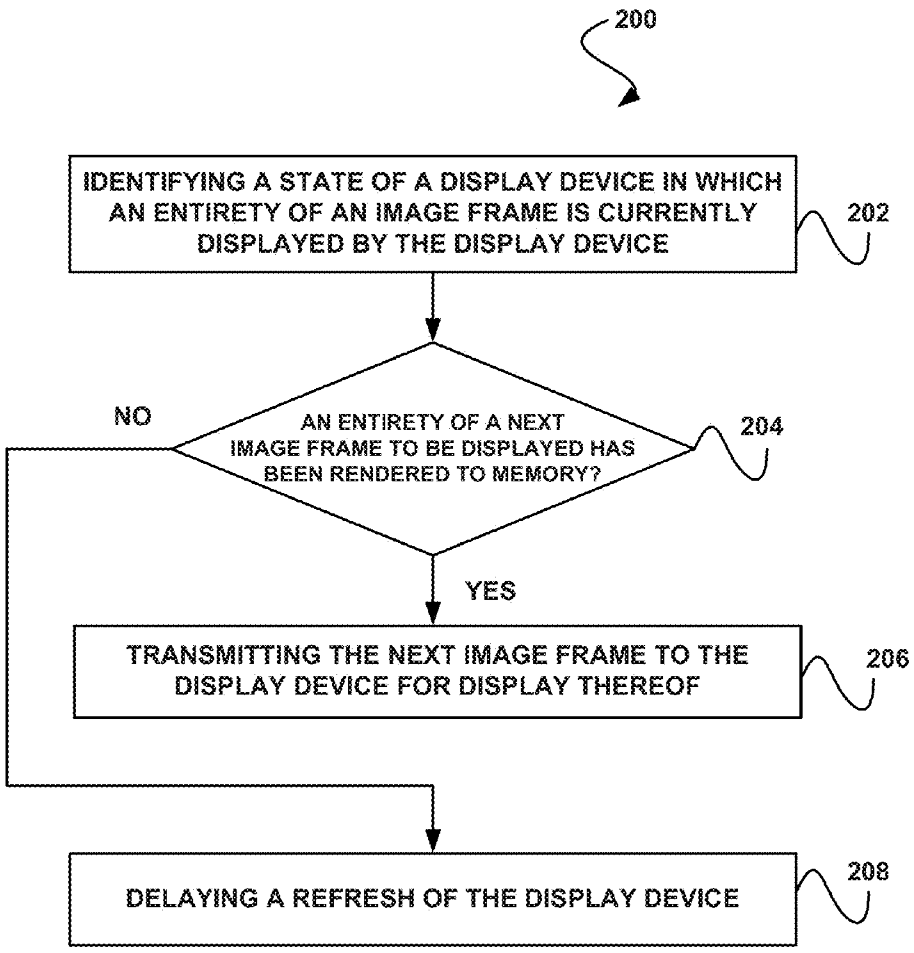
FIG. 2 shows a method providing a dynamic display refresh, in accordance with one embodiment.

FIG. 2 shows a method 200 providing a dynamic display refresh, in accordance with one embodiment. In operation 202, a state of a display device is identified in which an entirety of an image frame is currently displayed by the display device. In the context of the present description, the display device may be any device capable of displaying and holding the display of image frames. For example, the display device may be a liquid crystal display (LCD) device, a light emitting transistor (LET) display device, a light emitting diode (LED) display device, an organic LED (OLED) display device, an active matrix OLED (AMOLED) display device, etc. As another option, the display device may be a stereo display device displaying image frames having both left content intended for viewing by a left eye of a viewer and right content intended for viewing by a right eye of the viewer (e.g. where the left and right content are line interleaved, column interleaved, pixel interleaved, etc. within each image frame).

In various implementations, the display device may be an integrated component of a computing system. For example, the display device may be a display of a mobile device (e.g. laptop, tablet, mobile phone, hand held gaming device, etc.), a television display, projector display, etc. In other implementations the display device may be remote from, but capable of being coupled to, a computing system. For example, the display device may be a monitor or television capable of being connected to a desktop computer.

Moreover, the image frames may each be any rendered or to-be-rendered content representative of an image desired to be displayed via the display device. For example, the image frames may be generated by an application (e.g. game, video player, etc.) having a user interface, such that the image frames may represent images to be displayed as the user interface, should be noted that in the present description the image frames are, at least in part, to be displayed in an ordered manner to properly present the user interface of the application to a user. In particular, the image frames may be generated sequentially by the application, rendered sequentially by one or more graphics processing unit (GPUs), and further optionally displayed sequentially at least in part (e.g. when not dropped) by the display device.

As noted above, a state of the display device is identified in which an entirety (i.e. all portions of) of an image frame is currently displayed by the display device. For example, for a display device having a display screen (e.g. panel) that paints the image frame (e.g. from top-to-bottom) on a line-by-line basis, the state of the display device in which the entirety of the image frame is currently displayed by the display device may be identified in response to completion of a last scan line of the display device being painted. In any case, the state may be identified in any manner that indicates that the display device is ready to accept a new image.

In response to the identification of the state of the display device, it is determined whether an entirety of a next image frame to be displayed has been rendered to memory. Note decision 204. As described above, the image frames are, at least in part, to be displayed in an ordered manner. Accordingly, the next image frame may be any image frame generated by the application for rendering thereof immediately subsequent to the image frame currently displayed as identified in operation 202.

Such rendering may include any processing of the image frame from a first format output by the application to a second format for transmission to the display device. For example, the rendering may be performed on an image frame generated by the application (e.g. in 2D or in 3D) to have various characteristics, such as objects, one or more light sources, a particular camera viewpoint, etc. The rendering may generate the image frame in a 2D format with each pixel colored in accordance with the characteristics defined for the image frame by the application.

Accordingly, determining whether the entirety of the next image frame to be displayed has been rendered to memory may include determining whether each pixel of the image frame has been rendered, whether the processing of the image frame from a first format output by the application to a second format for transmission to the display device has completed, etc.

In one embodiment, each image frame may be rendered by a GPU or other processor to the memory. The memory may be located remotely from the display device or a component of the display device. As an option, the memory may include one or more buffers to which the image frames generated by the application are capable of being rendered. In the case of two buffers, the image frames generated by the application may be alternately rendered to the two buffers. In the case of more than two buffers, the image frames generated by the application may be rendered to the buffers in a round robin manner. To this end, determining whether the entirety of the next image frame to be displayed has been rendered to memory may include determining whether the entirety of the next image frame generated by the application has been rendered to one of the buffers.

As shown in operation 206, the next image frame is transmitted to the display device for display thereof, when it is determined in decision 204 that the entirety of the next image frame to be displayed has been rendered to the memory. In one embodiment, the next image frame may be transmitted to the display device upon the determination that the entirety of the next image frame to be displayed has been rendered to the memory. In this way, the next image frame may be transmitted as fast as possible to the display device when 1) the display device is currently displaying an entirety of an image frame (operation 202) and 2) when it is determined (decision 204) that the entirety of the next image frame to be displayed by the display device has been rendered to the memory.

Figure 3A:
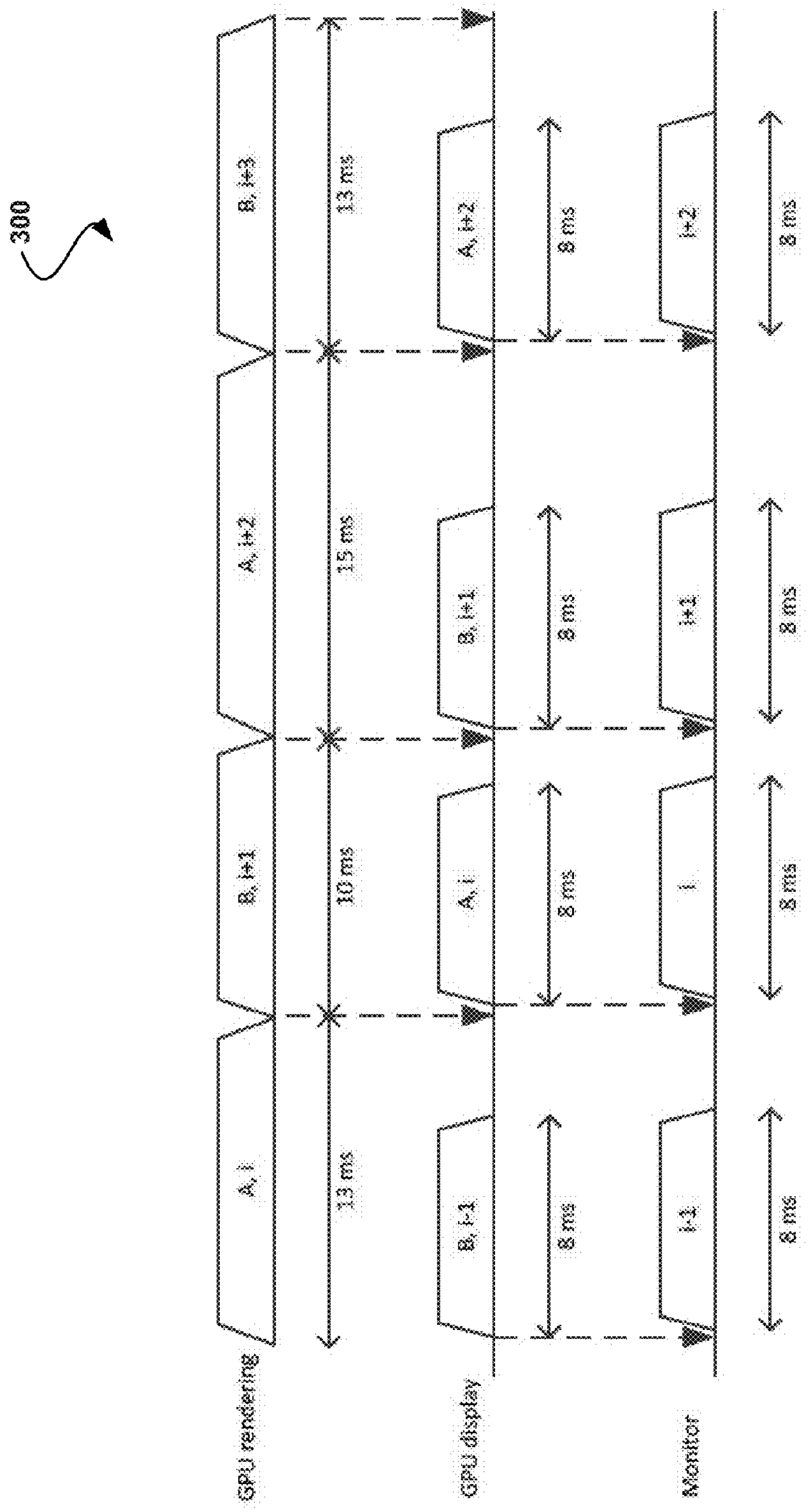
FIG. 3A shows a timing diagram relating to operation of a system having a dynamic display refresh, in accordance with another embodiment.

One embodiment the present method 200 is shown in FIG. 3A, where specifically the next image frame is transmitted to the display device as soon as rendering completes, assuming the entirety of the previously rendered image frame has been displayed by the display device (operation 202), such that latency is reduced. In particular, the resultant latency of the embodiment in FIG. 3A is purely set by two factors including 1) the time it takes to 'paint' the display screen of the display device starting at the top (or bottom, etc.) and 2) the time for a given pixel of the display screen to actually change state and emit the new intensity photons. Just by way of example, the latency that is reduced as described above may be the time between receipt of an input event to a display of a result of that input event. With respect to touch screen devices or pointing device with similar functionality, the latency between finger touch or pointing and a displayed result on screen and/or the latency when the user drags displayed objects around with his finger or by pointing may be reduced, thereby improving the quality of responsiveness. Moreover, since the next image frame is transmitted to the display device only when it is determined that the entirety of such next image frame has been rendered to memory, it is ensured that each image frame sent from memory to the display is an entire image.

Further, as shown in operation 208 in FIG. 2, a refresh of the display device is delayed, when it is determined that the entirety of the next image frame to be displayed has not been rendered to the memory. Accordingly, the refresh of the display device may be delayed automatically when 1) the display device is currently displaying an image frame in its entirety (operation 202) and 2) it is determined (decision 204) that the next image frame to be displayed has not been rendered to the memory in its entirety. In the present description, the refresh refers to any operation that paints the display screen of the display device with an image frame.

It should be noted that the refresh of the display device may be delayed as described above in any desired manner. In one embodiment, the refresh of the display device may be delayed by holding on the display device the display of the image frame from operation 202. For example, the refresh of the display device may be delayed by delaying a refresh operation of the display device. In another embodiment, the refresh of the display device may be delayed by extending a vertical blanking interval of the display device, which in turn holds the image frame on the display device.

In some situations, the extent to which the refresh of the display device is capable of being delayed may be limited. For example, there may be physical limitations on the display device, such as the display screen of the display device being incapable of holding its state indefinitely. With respect to such example, after a certain amount of time, which may be dependent on the model of the display device, the pixels may 'drift' away from the last stored value, and change (i.e. reduce, or increase) their brightness or color. Further, once the brightness of each pixel begins to change, the pixel brightness may continue to change until the pixel turns black, or white.

Accordingly, on some displays the refresh of the display device may be delayed only up to a threshold amount of time. The threshold amount of time may be specific to a model of the display device, for the reasons noted above. In particular, the threshold amount of time may include that time before which the pixels of the display device begin to change, or at least before which the pixels of the display device change a predetermined amount.

Further, the refresh of the display device may be delayed for a time period during which the next image frame is in the process of being rendered to the memory. Thus, the refresh of the display device may be delayed until 1) the refresh of the display device is delayed for a threshold amount of time, or 2) it is determined that the entirety of the next image frame to be displayed has been rendered to the memory, whichever occurs first.

Figure 5A:
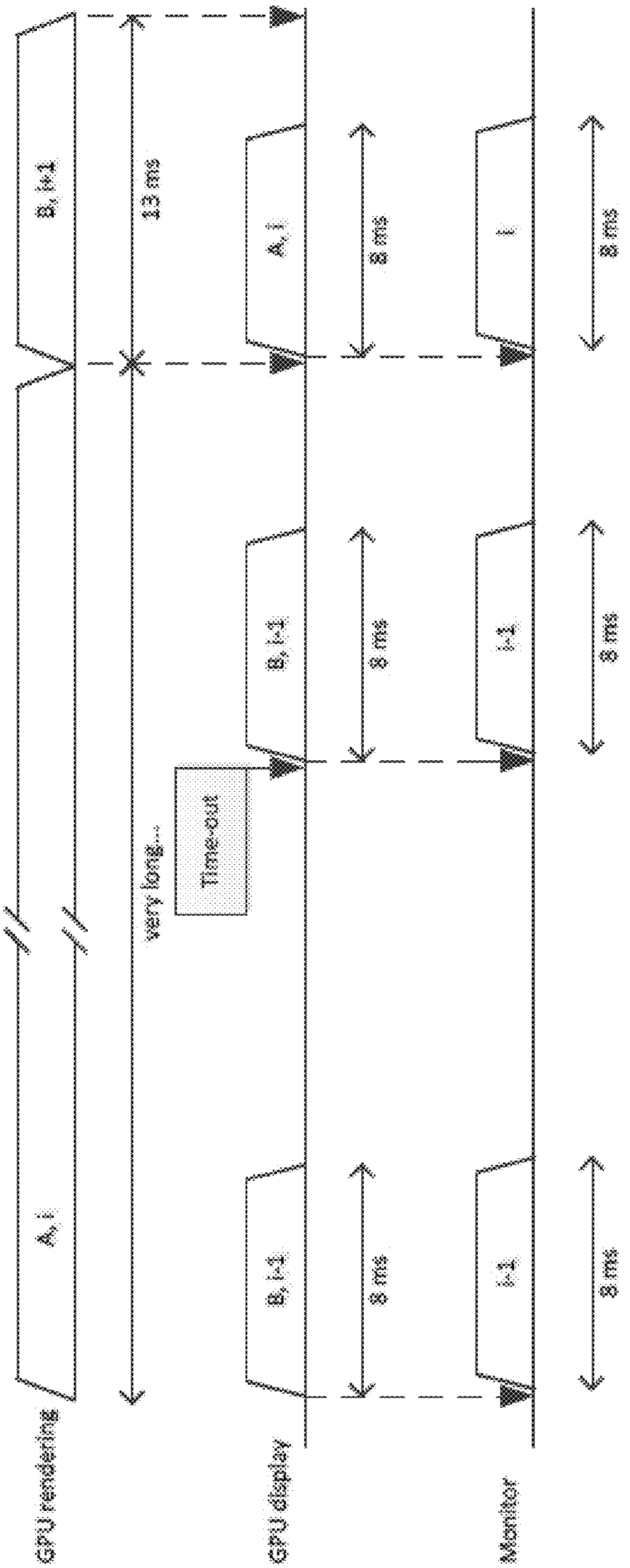
FIG. 5A shows a timing diagram relating to operation of a system having a dynamic display refresh in which image repetition is controlled by a graphics processing unit (GPU), in accordance with another embodiment.
Figure 5B:
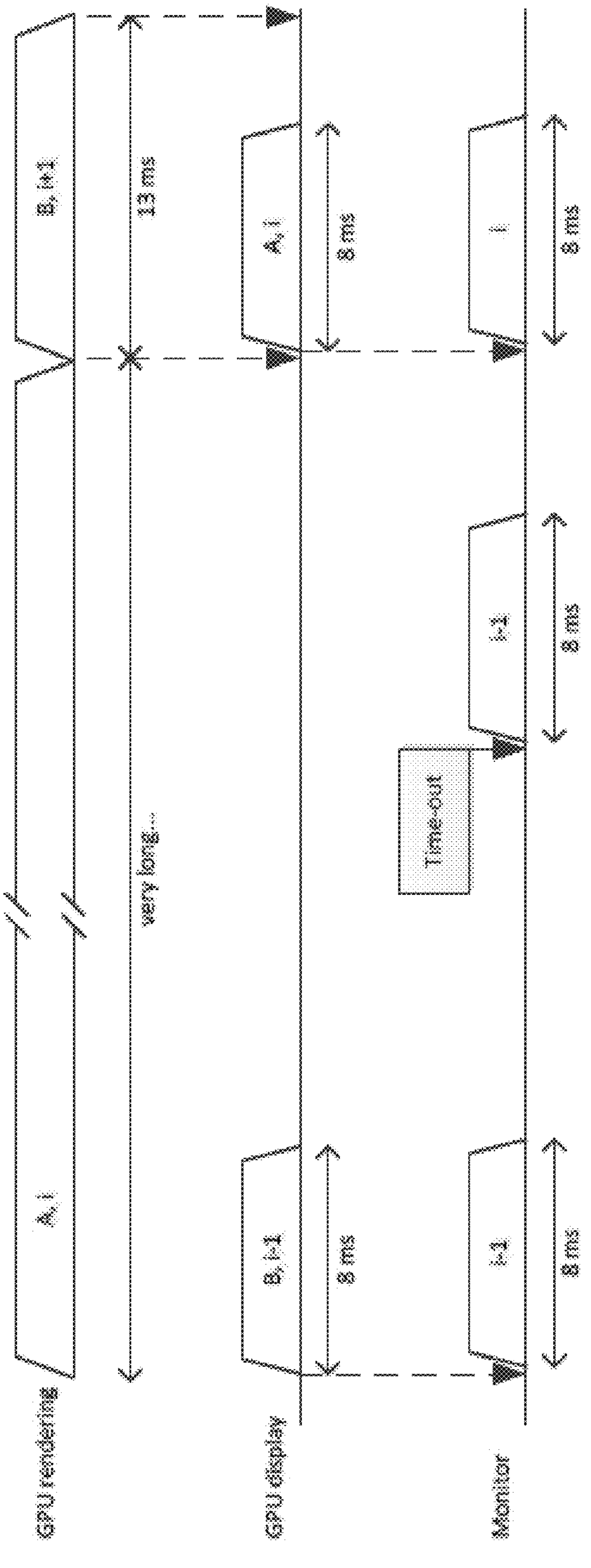
FIG. 5B shows a timing diagram relating to operation of a system having a dynamic display refresh in which image repetition is controlled by a display device, in accordance with another embodiment.

When the refresh of the display device is delayed for the threshold amount of time (i.e. without the determination that the entirety of the next image frame to be displayed has been rendered to the memory), the display of the image frame currently displayed by the display device may be repeated to ensure that the display does not drift and to allow additional time to complete rendering of the next image frame to memory, as described in more detail below. Various examples of repeating the display of the image frame are shown in FIGS. 5A-B as described in more detail below. By delaying the refresh of the display device (e.g. up to a threshold amount of time) when all of the next image frame to be displayed has not yet been rendered to the memory, additional time is allowed to complete the rendering of the next image frame. This ensures that each image frame sent from memory to the display is an entire image frame.

The capability to delay the refresh of the display device in the manner described above further improves smoothness of motion that is a product of the sequential display of the image frames, as opposed to the level of smoothness otherwise occurring when the traditional vsync-on mode is activated. In particular, smoothness is provided by allowing for additional time to render the next image frame to be displayed, instead of necessarily repeating display of the already displayed image frame which may take more time as required by the traditional vsync-on mode. Just by way of example, the main reason for improved motion for moving objects may be a result of the constant delay between completion of the rendering of an image and painting the image to the display. In addition, a game, for example, may have knowledge of when the rendering of an image completes. If the game uses that knowledge to compute 'elapsed time' and update position of all moving objects, the constant delay will make things that are moving smoothly look to be moving smoothly. This provides a potential improvement over vsync-on which has a constant (e.g. 16 mS) refresh, since for example it can only be decided whether to repeat a frame of show the next one every regular refresh (e.g. every 16 mS), thus causing unnatural motion because the game has no knowledge of when objects are displayed which adds some 'jitter' to moving objects. One example in which the delayed refresh described above allows for additional time to render a next image frame to be displayed is shown in FIG. 3A, as described in more detail below.

In addition, the amount of system power used may be reduced when the refresh is delayed. For example, power sent to the display device to refresh the display may be reduced by refreshing the display device less often (i.e. dynamically as described above). As a second example, power used by the GPU to transmit an image to the display device may be reduced by transmitting images to the display device less often. As a third example, power used by memory of the GPU may be reduced by transmitting images to the display device less often.

To this end, the method 200 of FIG. 2 may be implemented to provide a dynamic refreshing of a display device. Such dynamic refresh may be based on two factors including the display device being in a state where an entirety of an image frame is currently displayed by the display device (operation 202) and a determination of whether all of a next image frame to be displayed by the display device has been rendered to memory and is thus ready to be displayed by the display device. When an entirety of an image frame is currently displayed by the display device and a next image frame to be displayed (i.e. immediately subsequent to the currently displayed image frame) has been rendered in its entirety to memory, such next image frame may be transmitted to the display device for display thereof. The transmission may occur without introducing any delay beyond the inherent time required by the display system to 'paint' the display screen of the display device (e.g. starting at the top) and for a given pixel of the display screen to actually change state and emit the new intensity photons. Thus, the next image frame may be displayed as fast as possible once it has been rendered in its entirety, assuming the entirety of the previous image frame is currently being displayed.

When it is identified that the entirety of an image frame is currently displayed by the display device but that a next image frame to be displayed (i.e. immediately subsequent to the currently displayed image frame) has not yet been rendered in its entirety to memory, the refresh of the display device may be delayed. Delaying the refresh may allow additional time for the entirety of the next image frame to be rendered to memory, such that when the rendering completes during the delay the entirety of the rendered next image frame may be displayed as fast as possible in the manner described above.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 3A shows a timing diagram 300 relating to operation of a system having a dynamic display refresh, in accordance with another embodiment. As an option, the timing diagram 300 may be implemented in the context of the method of FIG. 2. Of course, however, the timing diagram 300 may be implemented in any desired environment. It should also be noted that the aforementioned definitions may apply during the present description.

As shown in the present timing diagram 300, the time required by the GPU to render each image frame to memory (shown on the timing diagram 300 as GPU rendering) is longer than the total time required for a rendered image frame to be scanned out in its entirety to a display screen of a display device (shown on the timing diagram 300 GPU display) and for the display screen of the display device to change state and emit the new intensity photons (shown on the timing diagram 300 as Monitor and hereinafter referred to as the refresh period). In other words, the GPU render frame rate in the present embodiment is slower than the maximum monitor refresh rate. In this case, the display refresh should follow the GPU render frame rate, such that each image frame is transmitted to the display device for display thereof as fast a possible upon the image frame being rendered in its entirety to memory.

In the specific example shown, the memory includes two buffers: buffer 'A' and buffer 'B'. When a state of the display device is identified in which an entirety of an image frame is currently displayed by the display device (e.g. image frame 'i−1'), then upon the next image frame 'i' being rendered in its entirety to buffer 'A', such next image frame 'i' is transmitted to the display device for display thereof. While that next image frame 'i' is being transmitted to the display device and painted on the display screen of the display device, a next image frame 'i+1' is rendered in its entirety to buffer and then upon that next image frame 'i+1' being rendered in its entirety to buffer 'B', such next image frame 'i+1' is transmitted to the display device for display thereof, and so on.

Because the GPU render frame rate is slower than the maximum monitor refresh rate, the refresh of the display device is delayed to allow additional time for rendering of each image frame to be displayed. In this way, rendering of each image frame may be completed during the time period in which the refresh has been delayed, such that the image frame may be transmitted to the display device for display thereof as fast a possible upon the image frame being rendered in its entirety to memory.

Figure 3B:
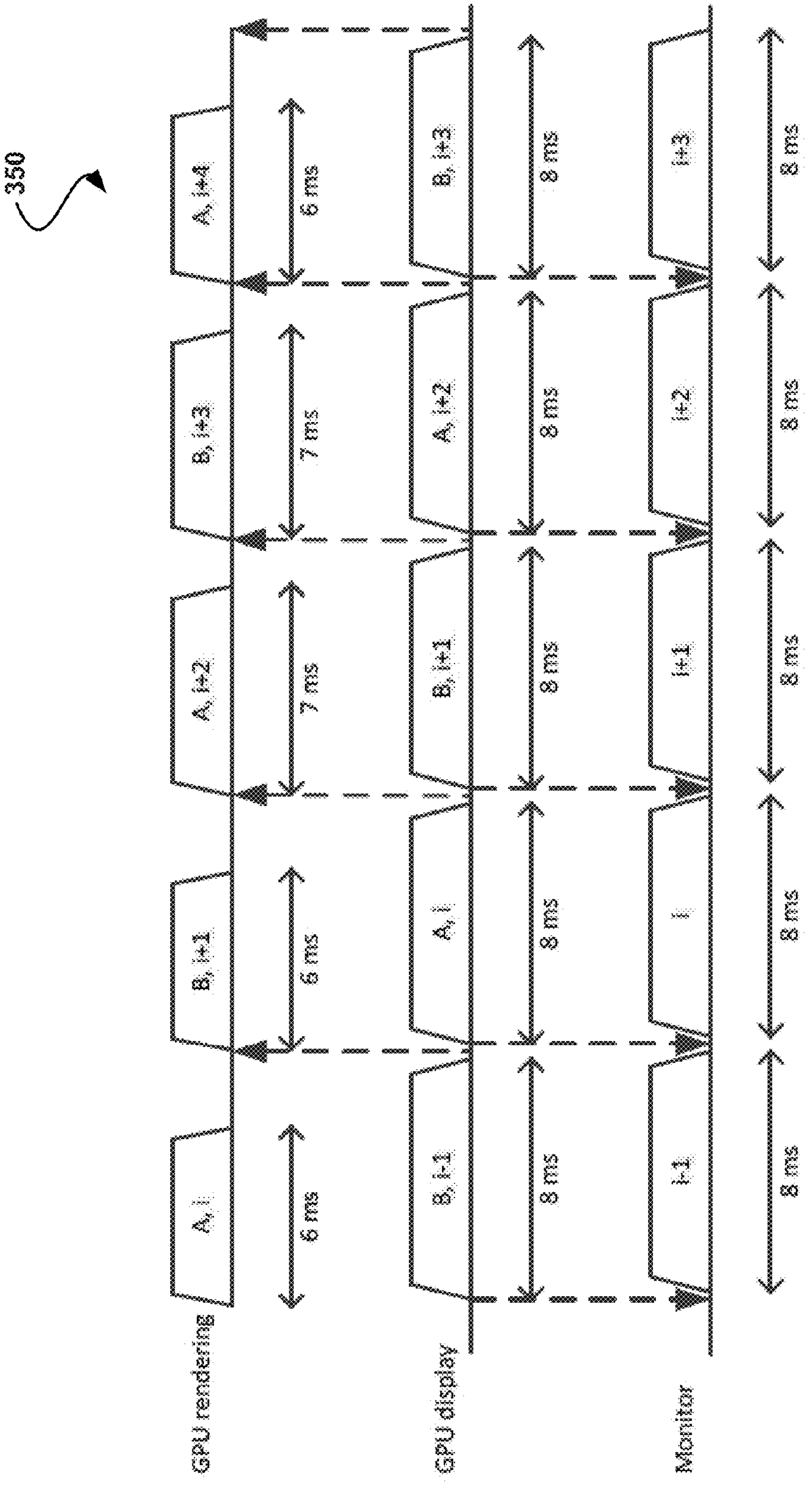
FIG. 3B shows a timing diagram relating to operation of a system in which a rendering time is shorter than a refresh period for a display device, in accordance with another embodiment.

FIG. 3B shows a timing diagram 350 relating to operation of a system in which a rendering time is shorter than a refresh period for a display device, in accordance with another embodiment. As an option, the timing diagram 350 may be implemented in the context of the method of FIG. 2. Of course, however, the timing diagram 350 may be implemented in any desired environment. It should also be noted that the aforementioned definitions may apply during the present description.

As shown in the present timing diagram 350, the time required by the GPU to render each image frame to memory is shorter than the total time required for a rendered image frame to be scanned out in its entirety to a display screen of a display device (shown as monitor) and for the display screen of the display device to change state and emit the new intensity photons (hereinafter referred to as the refresh period). In other words, in the present embodiment the GPU render frame rate is faster than the maximum monitor refresh rate. In this case, the monitor refresh period should be equal to the highest refresh rate or minimum monitor refresh period, such that minimal latency is caused to the GPU in waiting for a buffer to be free for rendering a next image frame thereto.

In the specific example shown, the memory includes two buffers: buffer 'A' and buffer 'B'. When a state is identified in which an entirety of an image frame is displayed by the display device (e.g. image frame 'i−1'), then the next image frame 'i' is transmitted to the display device for display thereof since it has already been rendered in its entirety to buffer 'A'. While that next image frame 'i' is being transmitted to the display device and painted on the display screen of the display device, a next image frame 'i+1' is rendered in its entirety to buffer 'B', and then upon an entirety of image frame 'i' being painted on the display screen of the display device the next image frame 'i+1' is transmitted to the display device for display thereof since it has already been rendered in its entirety to buffer 'B', and so on.

Because the GPU render frame rate is faster than the maximum monitor refresh rate, the refresh rate of the display device achieves highest frequency and it continues refreshing itself with new image frames as fast as the display device is able. In this way, the image frames may be transmitted from the buffers to the display device at the fastest rate by which the display device can display such images, such that the buffers may be freed for further rendering thereto as quickly as possible.

Figure 4:
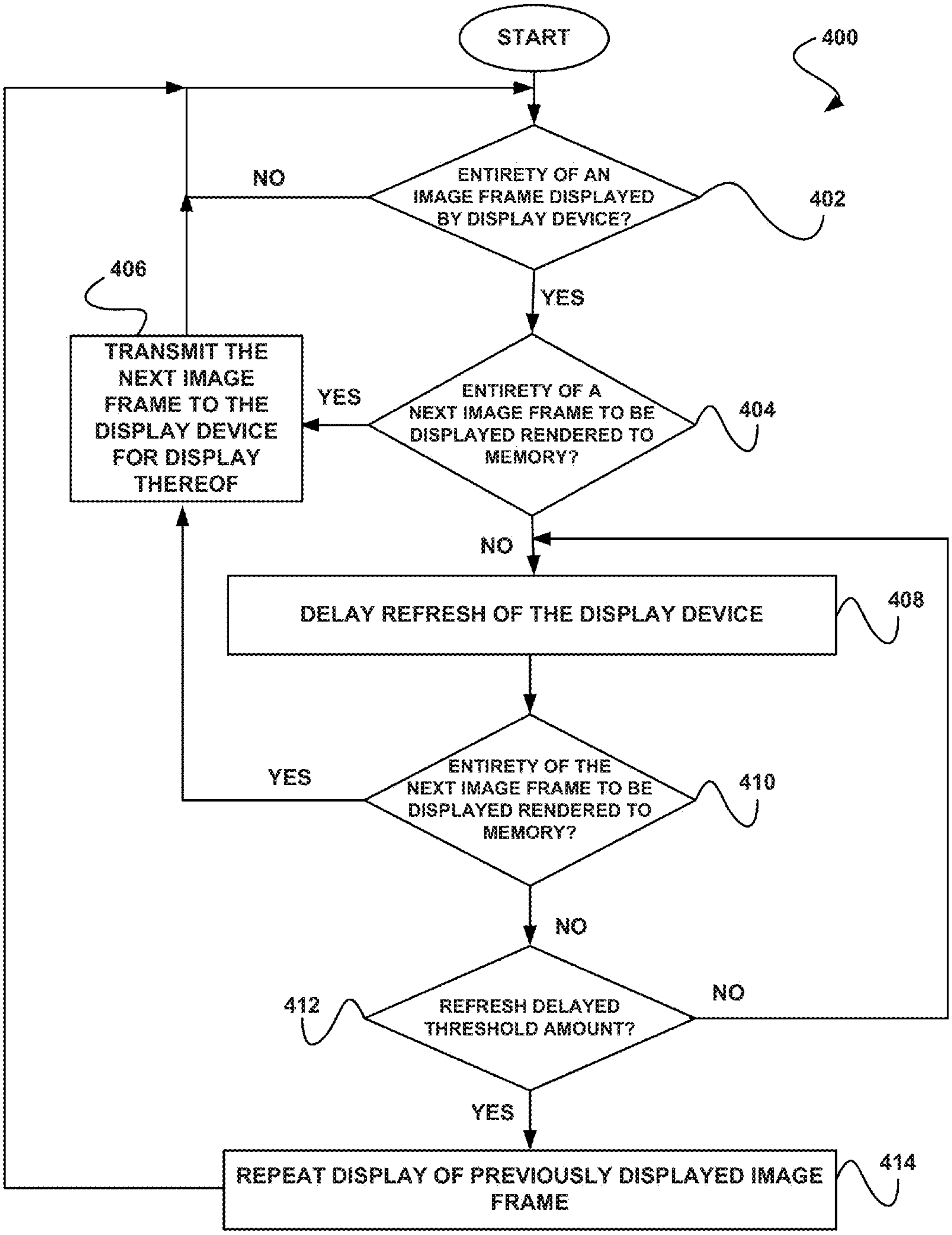
FIG. 4 shows a method providing image repetition within a dynamic display refresh system in accordance with yet another embodiment.

FIG. 4 shows a method 400 providing image repetition within a dynamic display refresh system in accordance with yet another embodiment. As an option, the method 400 may be carried out in the context of FIGS. 2-3B. Of course, however, the method 400 may be carried out in any desired context. Again, it should be noted that the aforementioned definitions may apply during the present description.

As shown, it is determined in decision 402 whether an entirety of an image frame is currently displayed by a display device. For example, it may be determined whether an image frame has been painted to a last scan line of a display screen of the display device. If it is determined that an entirety of an image frame is not displayed by the display device (e.g. that an image frame is still being written to the display device), the method 400 continues to wait for it to be determined that an entirety of an image frame is currently displayed by the display device Once it is determined that an entirety of an image frame is currently displayed by the display device, it is further determined in decision 404 whether an entirety of a next image frame to be displayed has been rendered to memory. If it is determined that an entirety of a next image frame to be displayed has been rendered to memory (e.g. the GPU render rate is faster than the display refresh rate), the next image frame is transmitted to the display device for display thereof. Note operation 406. Thus, the next image frame may be transmitted to the display device for display thereof as soon as both an entirety of an image frame is currently displayed by the display device and an entirety of a next image frame to be displayed has been rendered to memory.

However, if it is determined in decision 404 that an entirety of a next image frame to be displayed has not been rendered to memory (e.g. that the next image frame is still in the process of being rendered to memory, particularly in the case where the GPU render rate is slower than the display refresh rate), a refresh of the display device is delayed. Note operation 408. It should be noted that the refresh of the display device may be delayed by either 1) the GPU waiting up to a predetermined period of time before transmitting any further image frames to the display device, or 2) instructing the display device to ignore an unwanted image frame transmitted to the display device when hardware of a GPU will not wait (e.g. is incapable of waiting, etc.) up to the predetermined period of time before transmitting any further image frames to the display device.

In particular, with respect to case 2) of operation 408 mentioned above, it should be noted that some GPU's are incapable of implementing the delay described in case 1) of operation 408. In particular, some GPU's can only implement a limited vertical blanking interval, such that any attempt to increase that vertical blanking interval may result in a hardware counter overflow where the GPU starts a scanout from the memory regardless of the contents of the memory (i.e. regardless of whether an entirety of an image frame has been rendered to the memory). Thus, the scanout may be considered a bad scanout since the memory contents being transmitted via the scanout may not be an entirety of a single image frame and thus may be unwanted.

The GPU software may be aware that a bad scanout is imminent. Due to the nature of the GPU however, the hardware scanout may be incapable of being stopped by software, such that the bad scanout will happen. To prevent the display device from showing the unwanted content, the GPU software may send a message to the display device to ignore the next scanout. This message can be sent over i2c in case of a digital video interface (DVI) cable, or as an i2c-over-Aux or Aux command in case of a display port (DP) cable. The message can be formatted as monitor command control set (MCCS) command or other similar command. Alternately, the GPU may signal this to the display device using any other technique, such as for example a DP InfoFrame, de-asserting data enable (DE), or other in-band or out-band signaling techniques.

As another option, the GPU counter overflow may be handled purely inside the display device. The GPU may tell the display device at startup of the associated computing device what the timeout value is that the display device should use. The display device then applies this timeout and will ignore the first image frame received after the timeout occurs. If the GPU timeout and display device timeout occur simultaneously, the display device may self-refresh the display screen and discard the next incoming image frame.

As yet another option, the GPU software may realize that the scanout is imminent, but 'at the last moment' change the image frame that is being scanned out to be the previous frame. In that case, there may not necessarily be any provision in the display device to deal with the bad scanout. In cases where this technique is used, where the GPU counter overflow always occurs earlier than the display device timeout, no display device timeout may be necessary, since a refresh due to counter overflow may always occurs in time.

Moreover, in the case that the GPU display logic may have already pre-fetched a few scan lines of data from buffer 'B' when the re-program to buffer 'A' occurs, these (incorrect) lines may be sent to the display device. This case can be handled by the display device always discarding for example, the top three lines of what is sent, and making the image rendered/scanned by the GPU three lines higher.

While the refresh of the display device is being delayed, it may continuously, periodically, etc. be determined whether an entirety of a next image frame to be displayed has been rendered to memory, as shown in decision 410, until the refresh of the display device is delayed for a threshold amount of time (i.e. decision 412) or it is determined that the entirety of the next image frame to be displayed has been rendered to the memory (i.e. decision 410), whichever occurs first If it is determined in decision 410 that the entirety of the next image frame to be displayed has been rendered to the memory before it is determined that the refresh of the display device has been delayed for a threshold amount of time ("YES" on decision 410), then the next image frame is transmitted to the display device for display thereof. Note operation 406. On the other hand, if it is determined in decision 412 that the refresh of the display device has been delayed for the threshold amount of time before it is determined that the entirety of the next image frame to be displayed has been rendered to the memory ("YES" on decision 412), then display of a previously displayed image frame is repeated. Note operation 414. Such previously displayed image frame may be that currently displayed by the display device.

In one embodiment, the repeating of the display of the image frame may be performed by a GPU re-transmitting the image frame to the display device (e.g. from the memory). For example, the re-transmitting of the image frame to the display device may occur when the display device does not have internal memory in which a copy of the image frame is stored while being displayed. In another embodiment where the display device does include internal memory, the repeating of the display of the image frame may be performed by the display device displaying the image frame from the internal memory (e.g. a DRAM buffer internal to the display device).

Thus, either the GPU or the display device may control the repeating of the display of a previously displayed image frame, as described above. In the case of the display device controlling the repeated display of image frames, the display device may have a built-in timeout value which may be specific to the display screen of the display device. A scaler or timing controller (TCON) of the display device may detect when it has not yet received the next image frame from the GPU within the timeout period and may automatically repaint the display screen with the previously displayed image frame (e.g. from its internal memory). As another option, the display device may have a timing controller capable of initiating the repeated display of the image frame upon completion of the timeout period.

In the case of the GPU controlling the repeated display of image frames, GPU scanout logic may drive the display device directly, without a scaler in-between. Accordingly, the GPU may perform the timeout similar to that described above with respect to the scaler of the display device. The GPU may then detect a (e.g. display screen specific) timeout, and initiate re-scanout of the previously displayed image frame.

FIGS. 5A-5B show an example of operation where a previously displayed image frame is repeated to allow additional time to render a next image frame to memory, in accordance with various embodiments. In particular, FIG. 5A shows an exemplary timing diagram relating to operation of a system having a dynamic display refresh in which image repetition is controlled as described above by a GPU. FIG. 5B shows an exemplary timing diagram relating to operation of a system having a dynamic display refresh in which image repetition is controlled as described above by the display device.

Multiple different techniques may be implemented once display of a previously displayed image frame is repeated. In one embodiment, the method 400 may optionally revert to decision 402, such that the next image frame may be transmitted to the display device for display thereof only once an entirety of the repeated image frame is displayed ("YES" on decision 402) and an entirety of the next image frame to be displayed is rendered to memory ("YES" on decision 404). For example, when the entirety of the next image frame to be displayed has been rendered to the memory before an entirety of the repeated image frame is displayed by the display device, the method 400 may wait for the entirety of the repeated image frame to be displayed by the display device. In this case the next image frame may be transmitted to the display device for display thereof in response to identifying a state of the display device in which the entirety of the repeated image frame is currently displayed by the display device.

Figure 6A:
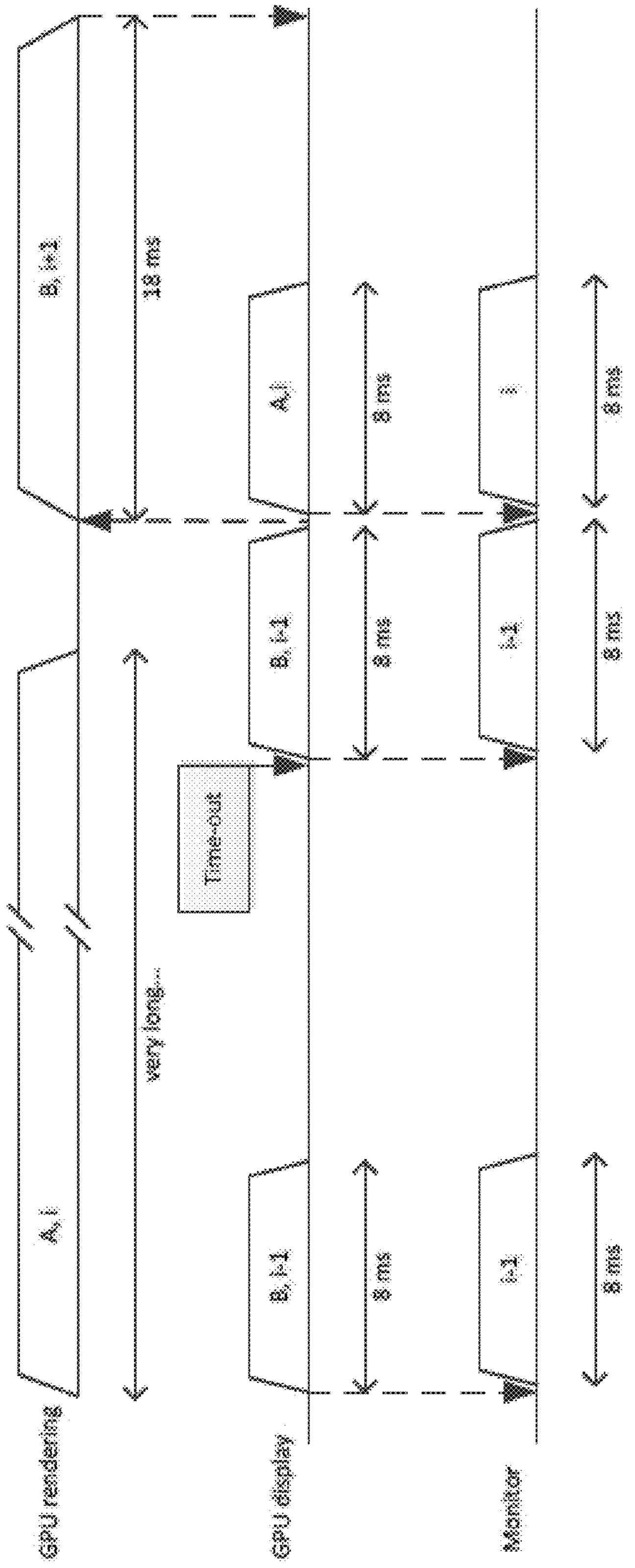
FIG. 6A shows a timing diagram relating to operation of a system having a dynamic display refresh in which image repetition is controlled by a GPU for display of a next image frame after an entirety of a repeat image frame has been displayed, in accordance with yet another embodiment.
Figure 6B:
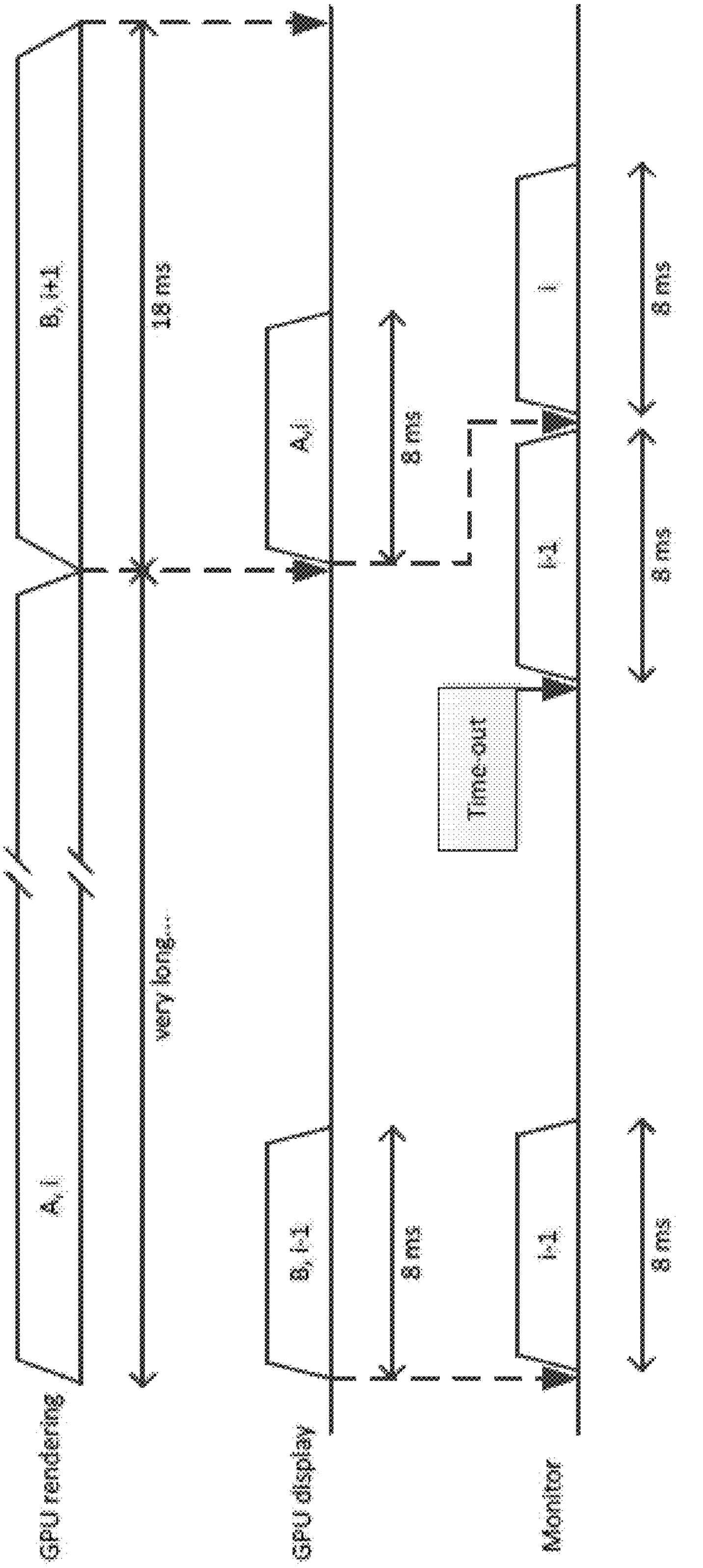
FIG. 6B shows a timing diagram relating to operation of a system having a dynamic display refresh in which image repetition is controlled by a display device for display of a next image frame after an entirety of a repeat image frame has been displayed, in accordance with yet another embodiment.

FIGS. 6A-6B show examples of operation where the next image frame, rendered in its entirety, is transmitted to the display device for display thereof in response to identifying a state of the display device in which the entirety of the repeated image frame is currently displayed by the display device. In particular, FIG. 6A shows an exemplary timing diagram relating to operation of a system having a dynamic display refresh in which image repetition is controlled by a GPU for display of a next image frame, rendered in its entirety, after an entirety of a repeat image frame has been displayed. FIG. 6B shows an exemplary timing diagram relating to operation of a system having a dynamic display refresh in which image repetition is controlled by a display device for display of a next image frame, rendered in its entirety, after an entirety of a repeat image frame has been displayed. In the context of FIG. 6B, the GPU may optionally transmit the next image frame, which has been rendered in its entirety, to the display device, and the display device may then buffer the received next image frame to display it as soon as the display device state is identified in which the entirety of the repeated image frame is currently displayed.

As a further option to the above described embodiment (e.g. FIGS. 6A-6B) where rendering of a second image frame completes during the repeat painting of the previously rendered first image frame on the display screen, the timeout period implemented by the GPU or the display device with respect to the display of the second image frame may be automatically adjusted. For example, a rendering time for an image frame may correlate with the rendering time for a previously rendered image frame (i.e. image frames in a sequence may have similar content and accordingly similar rendering times). Thus, in the above embodiment it may be estimated that a third image frame following the second image frame may require the same or similar rendering time as the time that was used to render the second image frame. Since the second image frame completed during the painting of the repeat first image frame on the display screen, the timeout period may be reduced to allow for an estimated time of completion of the painting of the second image frame on the display screen to coincide with the estimated time of completion of the rendering of the third image frame. Thus, with the adjusted timeout, the actual time of completion of the painting of the second image frame on the display screen may closely coincide with the actual completion of the rendering of the third image frame. By adjusting the timeout period, visible stutter may be reduced by avoiding the alternating use/non-use of a non-approximated delay between image frames.

Further, when an entirety of the repeated image frame is displayed but an entirety of the next image frame to be displayed has still not yet been rendered to the memory, the method 400 may revert to operation 408 whereby the refresh of the display device is again delayed. Accordingly, the method 400 may optionally repeat operations 408-414 when the repeated image frame is displayed, such that the display of a same image frame may be repeated numerous times (e.g. when necessary to allow sufficient time for the next image frame to be rendered to memory).

In another optional embodiment where display of a previously displayed image frame is repeated, the next image frame may be transmitted to the display device for display thereof solely in response to a determination that the entirety of the next image frame to be displayed has been rendered to the memory, and thus without necessarily identifying a display device state in which the entirety of the repeated image frame is currently displayed by the display device. In other words, when the entirety of the next image frame to be displayed has been rendered to the memory before an entirety of the repeated image frame is displayed by the display device, the next image frame may be transmitted to the display device for display thereof without necessarily any consideration of the state of the display device.

In one implementation of the above described embodiment, upon receipt of the next image frame by the display device, the display device may interrupt painting of the repeated image frame on a display screen of the display device and may begin painting of the next image frame on the display screen of the display device at a point of the interruption. This may result in tearing, namely simultaneous display by the display device of a portion of the repeated image frame and a portion of the next image frame. However, this tearing will be minimal in the context of the present method 400 since it will only be tolerated in the specific situation where the entirety of the next image frame to be displayed has been rendered to the memory before an entirety of the repeated image frame is displayed by the display device.

Figure 7A:
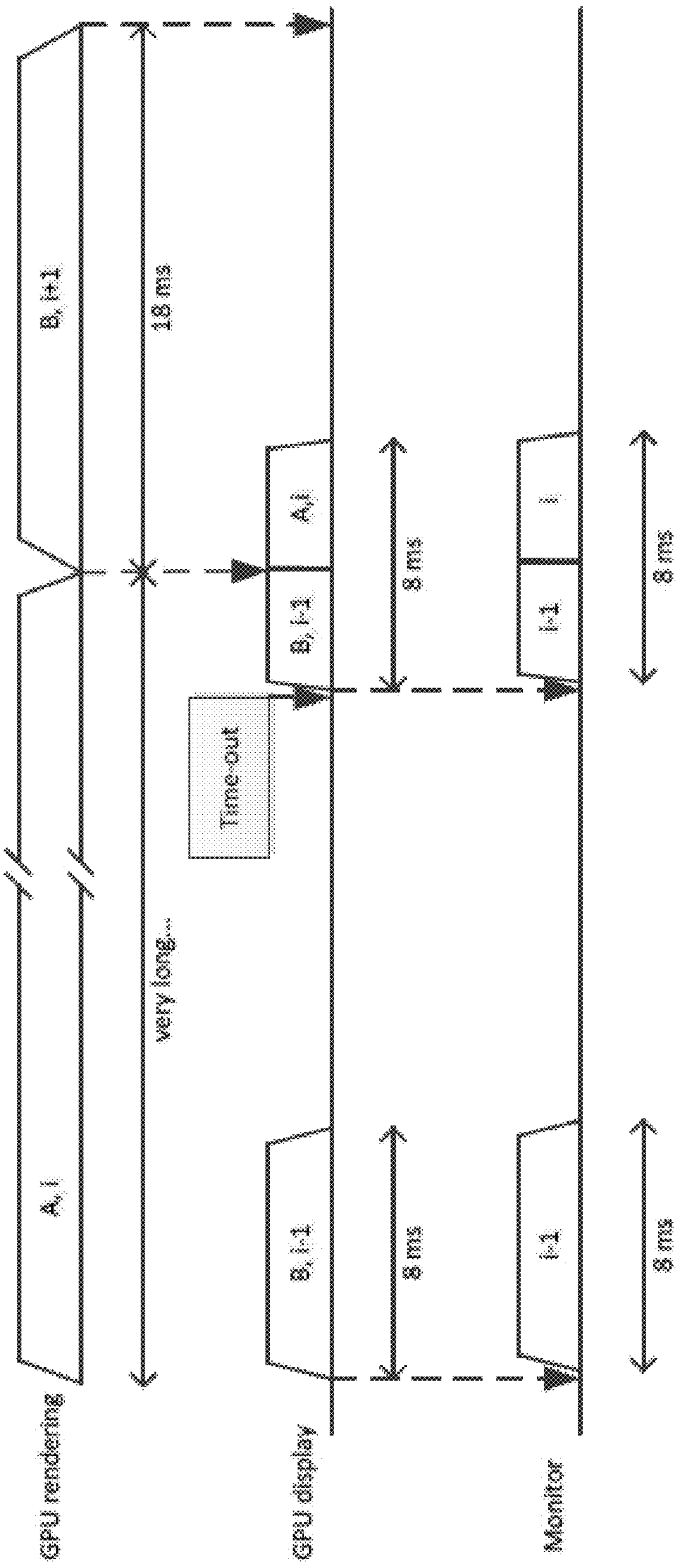
FIG. 7A shows a timing diagram relating to operation of a system having a dynamic display refresh in which image repetition is controlled by a GPU for interrupting display of a repeat image frame and displaying a next image frame at a point of the interruption on a display screen of the display device, in accordance with still yet another embodiment.
Figure 7B:
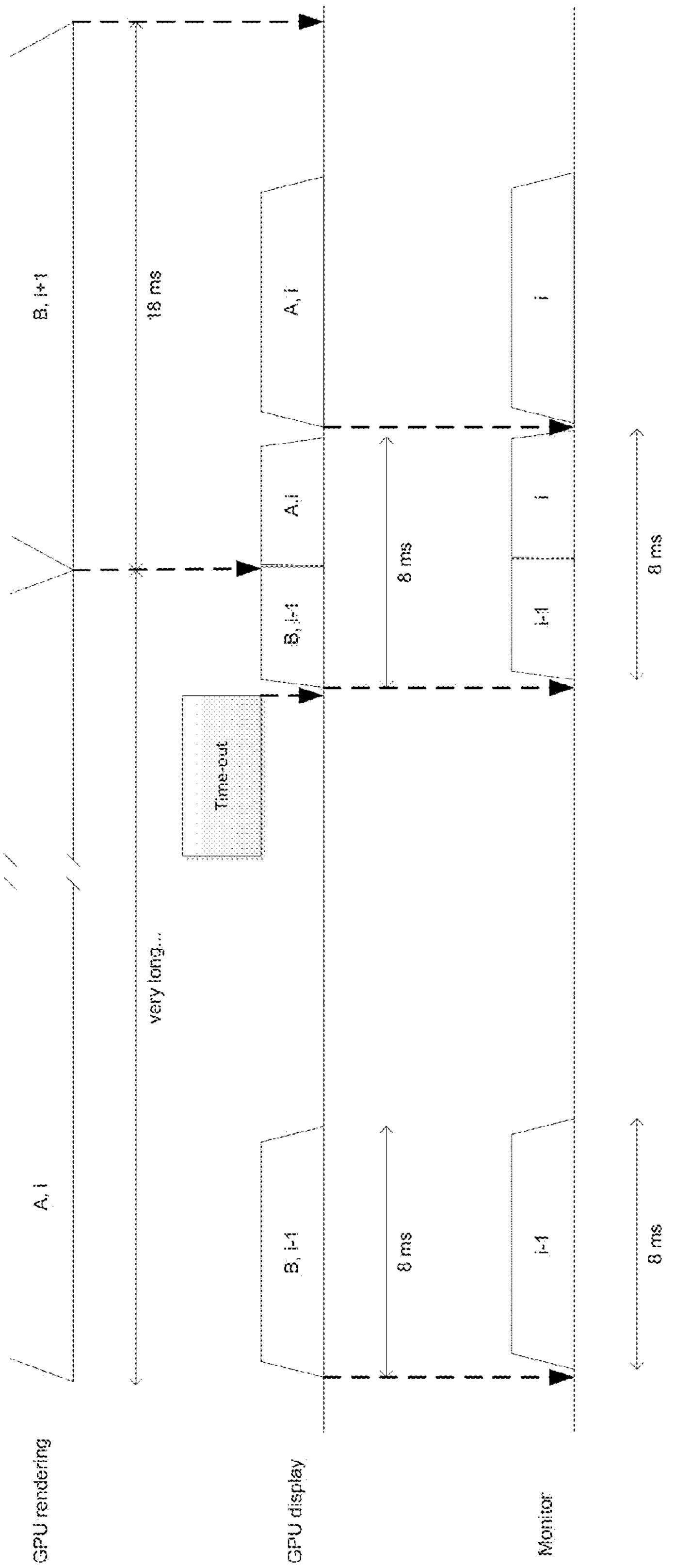
FIG. 7B shows a timing diagram in accordance with the timing diagram of FIG. 7A which additionally includes automatically repeating the display of the next image frame by painting the repeated next image frame at a first scan line of a display screen of the display device, in accordance with yet another embodiment.
Figure 7C:
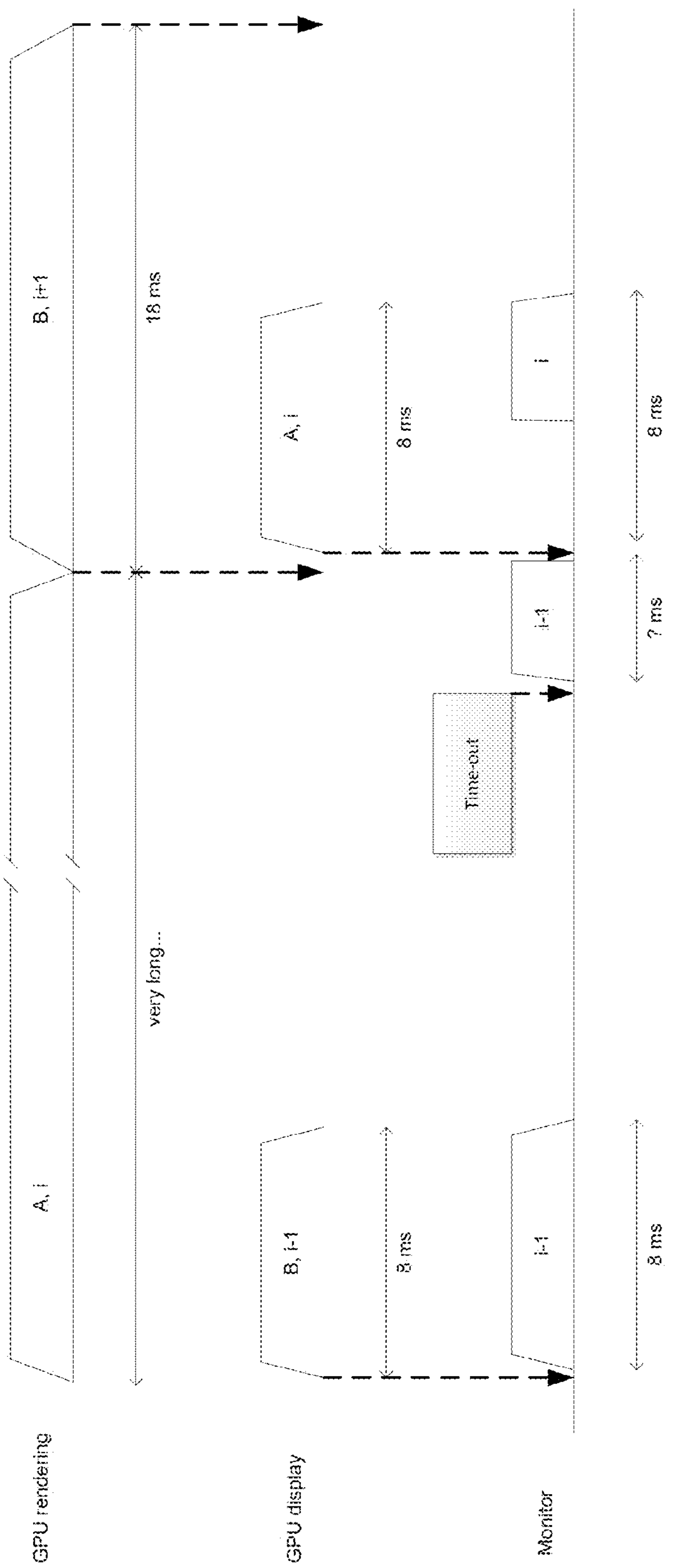
FIG. 7C shows a timing diagram relating to operation of a system having a dynamic display refresh in which image repetition is controlled by a display device for interrupting display of a repeat image frame and displaying a next image frame at a point of the interruption on a display screen of the display device, in accordance with yet another embodiment.

FIGS. 7A-7C show examples of operation where the display device interrupts painting of the repeated image frame on a display screen of the display device and begins painting of the next image frame on the display screen of the display device at a point of the interruption, as described above. In particular, FIG. 7A shows an exemplary timing diagram relating to operation of a system having a dynamic display refresh in which image repetition is controlled by a GPU for interrupting display of a repeat image frame and displaying a next image frame at a point of the interruption on a display screen of the display device. FIG. 7B shows a timing diagram in accordance with the timing diagram of FIG. 7A, but which additionally includes automatically repeating the display of the next image frame by painting the repeated next image frame at a first scan line of a display screen of the display device. For example, since the interruption shown in FIGS. 7A and 78 causes tearing (i.e. at the point where the image frame ends on the display screen and the next image frame begins on the display screen), the displayed next image frame may be quickly overwritten by another instance of the next image frame to remove the visible tear from the display screen as fast as possible.

FIG. 7C shows an exemplary timing diagram relating to operation of a system having a dynamic display refresh in which image repetition is controlled by a display device for interrupting display of a repeat image frame and displaying a next image frame at a point of the interruption on a display screen of the display device. It should be noted that in the context of FIG. 7C, the display device may be operable to hold the already painted portion of the repeat image frame on the display screen while continuing with the painting of the next image at the point of the interruption.

In another implementation of the above described embodiment, upon receipt of the next image frame by the display device, the display device may interrupt painting of the repeated image frame on a display screen of the display device and may begin painting of the next image frame on the display screen of the display device at a first scan line of the display screen of the display device. This may allow for an entirety of the next image frame being displayed by the display device, such that the tearing described above may be avoided.

Figure 8A:
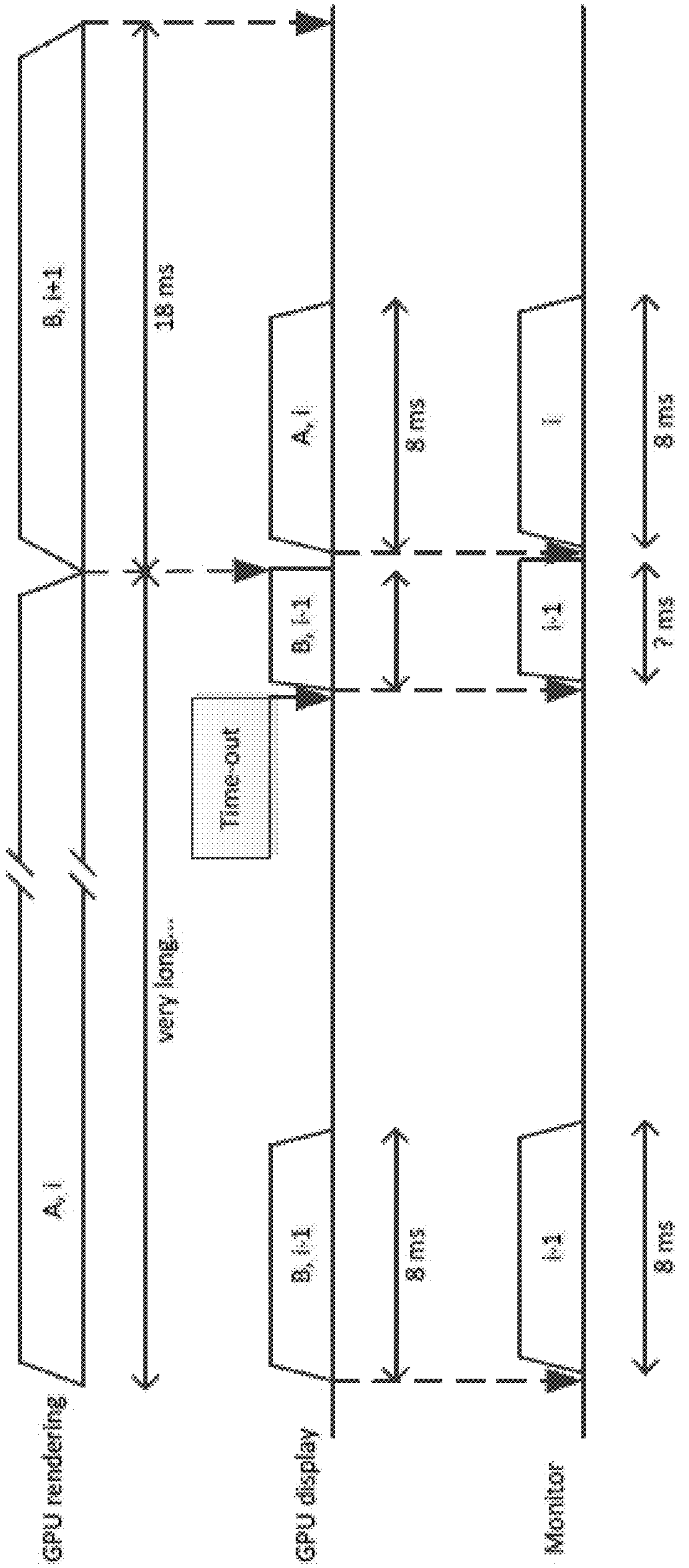
FIG. 8A shows a timing diagram relating to operation of a system having a dynamic display refresh in which image repetition is controlled by a GPU for interrupting display of a repeat image frame and displaying a next image frame at a first scan line of a display screen of the display device, in accordance with another embodiment.
Figure 8B:
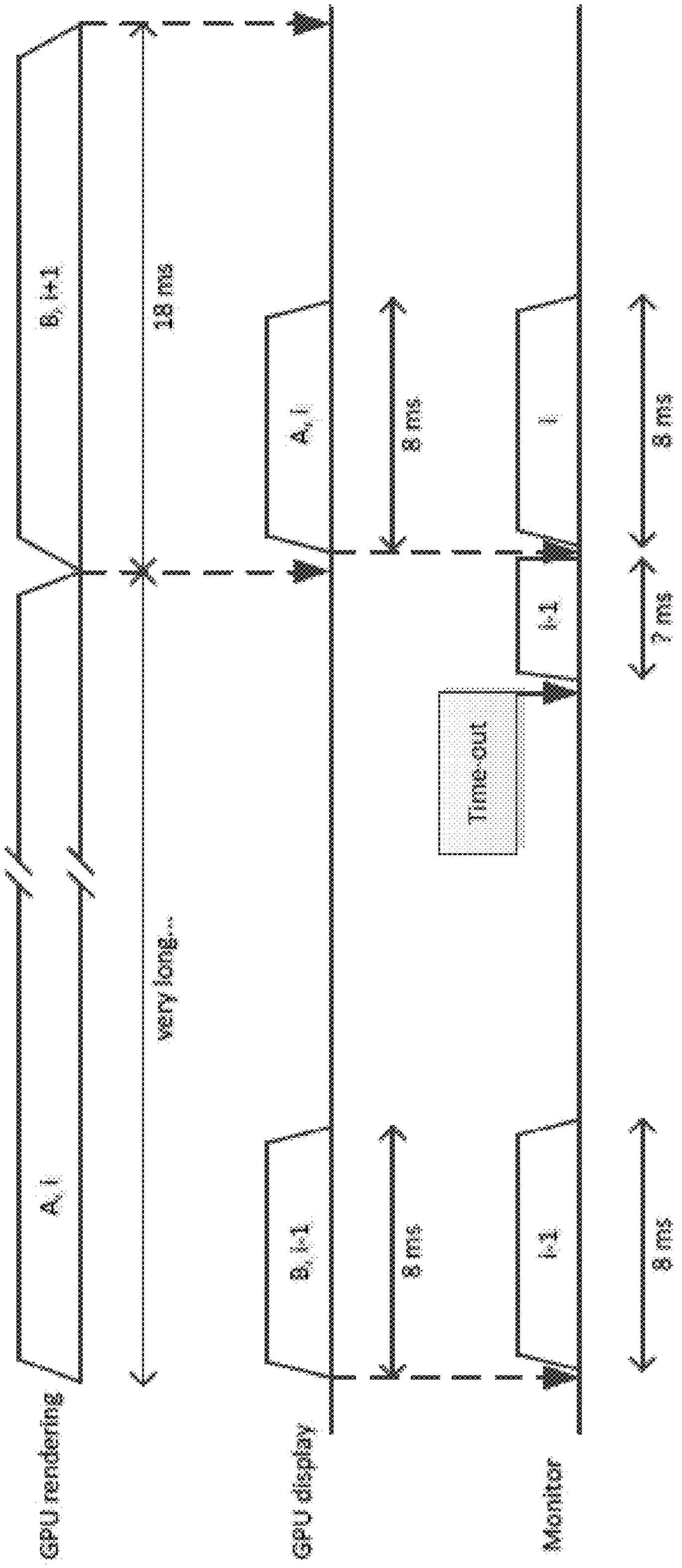
FIG. 8B shows a timing diagram relating to operation of a system having a display refresh in which image repetition is controlled by a display device for interrupting display of a repeat image frame and displaying a next image frame at a first scan line of a display screen of the display device, in accordance with another embodiment.

FIGS. 8A-8B show examples of operation where the display device interrupts painting of the repeated image frame on a display screen of the display device and begins painting of the next image frame on the display screen of the display device at a first scan line of a display screen of the display device. In particular, FIG. 8A shows an exemplary timing diagram relating to operation of a system having a dynamic display refresh in which image repetition is controlled by a GPU for interrupting display of a repeat image frame and displaying a next image frame at a first scan line of a display screen of the display device. It should be noted that in the context of FIG. 8A, the GPU may control the display device to restart the refresh of the display screen such that the next image frame is painted starting at first scan line of the display screen. FIG. 8B shows an exemplary timing diagram relating to operation of a system having a dynamic display refresh in which image repetition is controlled by a display device for interrupting display of a repeat image frame and displaying a next image frame at a first scan line of a display screen of the display device.

As an optional extension of the method 400 of FIG. 4, which may not necessarily be limited to each of the operations of the method 400, a technique may be employed to improve the display device response time by modifying a pixel value as a function of a display duration estimate (e.g. as described in more detail below with reference to FIGS. 9-11).

Figure 9:
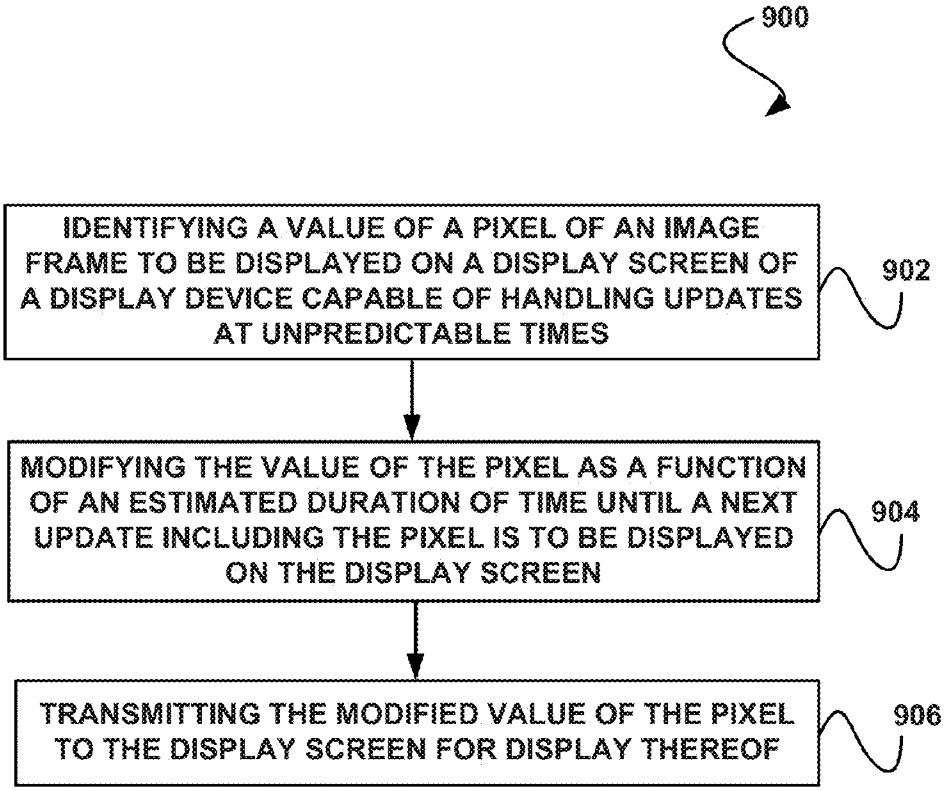
FIG. 9 shows a method for modifying a pixel value as a function of a display duration estimate, in accordance with another embodiment.

FIG. 9 shows a method 900 for modifying a pixel value as a function of a display duration estimate, in accordance with another embodiment. As an option, the method 900 may be carried out in the context of FIGS. 2-8B. Of course, however, the method 900 may be carried out in any desired context. Again, it should be noted that the aforementioned definitions may apply during the present description.

As shown in operation 902, a value of a pixel of an image frame to be displayed on a display screen of a display device is identified, wherein the display device is capable of handling updates at unpredictable times. The display device may be capable of handling updates at unpredictable times in the manner described above with reference to dynamic refreshing of the display device as described above with reference to the previous Figures. In one embodiment, the display screen may be a component of a 2D display device.

In one embodiment, the value of the pixel of the image frame to be displayed may be identified from a GPU. For example, the value may result from rendering and/or any other processing of the image frame by the GPU. Accordingly, the value of the pixel may be a color value of the pixel.

Additionally, as shown in operation 904, the value of the pixel is modified as a function of an estimated duration of time until a next update including the pixel is to be displayed on the display screen. Such estimated duration of time may be, in one embodiment, the time from the display of the pixel to the time when the pixel is updated (e.g. as a result of display of a new image frame including the pixel). It should be noted that modifying the value of the pixel may include changing the value of the pixel in any manner that is a function of an estimated duration of time until a next update including the pixel is to be displayed on the display screen.

In one embodiment, the estimated duration of time may be determined based on, or determined as, a duration of time in which a previous image frame was displayed on the display screen, where for example the previous image frame immediately precedes the image frame to be displayed. Of course, as another option the estimated duration of time may be determined based on a duration of time in which each of a plurality of a previous image frames were displayed on the display screen.

Just by way of example, the value of the pixel may be modified by performing a calculation utilizing an algorithm that takes into account the estimated duration of time until the next update including the pixel is to be displayed on the display screen. Table 1 illustrates one example of the algorithm that may be used to modify the value of the pixel as a function of the estimated duration of time until the next update including the pixel is to be displayed on the display screen. Of course, the algorithm shown in Table 1 is for illustrative purposes only and should not be construed as limiting in any manner.

TABLE 1

| |
|---|
| Pixel_sent(i, j, t) = f(pixel_in(i, j, t), pixel_in(i, j, t−1), estimated_frame_duration(t)) |
| where pixel_in(i, j, t) is the identified value of the pixel at screen position i,j, |
| pixel_in(i, j, t−1) is a previous value of the pixel at screen position i,j included in a previous image frame displayed by the display screen, and |
| estimated_frame_duration(t) is the estimated duration of time until the next update including the pixel is to be displayed. |

As shown in Table 1, the value of a pixel sent to the display screen may be modified as a function of the identified value of the pixel at a particular screen location (e.g. received from the GPU), the previous value of the pixel included in a previous image frame displayed by the display screen at that same screen location, and the estimated duration of time until the next update including the pixel is to be displayed. In one embodiment, the modified pixel value may be a function of the screen position (i,j) of the pixel, which is described in U.S. patent application Ser. No. 12/901,447, filed Oct. 8, 2010, and entitled "System, Method, And Computer Program Product For Utilizing Screen Position Of Display Content To Compensate For Crosstalk During The Display Of Stereo Content," by Gerrit A. Slavenburg, which is hereby incorporated by reference in its entirety.

Further to the algorithm shown in Table 1, it should be noted that the estimated_frame_duration(t) may be determined utilizing a variety of techniques. In one embodiment, the estimated_frame_duration(t)=frame_duration(t−1), where frame_duration(t−1) is a duration of time that the previous image frame was displayed by the display screen. In another embodiment, the estimated_frame_duration(t) is an average duration of time that a predetermined number of previous image frames were displayed by the display screen, such as estimated_frame_duration(t)=average of frame_duration(t−1), frame_duration(t−2), frame_duration(t−N) where N is a predetermined number. In yet another embodiment, the estimated_frame_duration(t) is a minimum duration of time among durations of time that a predetermined number of previous image frames were displayed by the display screen, such as estimated_frame_duration(t)=minimum of (frame_duration(t−1), frame_duration(t−2), . . . frame_duration(t−N)) where N is a predetermined number.

As another option, the estimated_frame_duration(t) may be determined as a function of durations of time that a predetermined number of previous image frames were displayed by the display screen, such as estimated_frame_duration(t)= function of [frame_duration(t−1), frame_duration(t−2), frame_duration(t−N)] where N is a predetermined number. Just by way of example, the estimated_frame_duration(t) may be determined from recognition of a pattern (e.g. cadence) among the durations of time that the predetermined number of previous image frames were each displayed by the display screen. Such recognition may be performed via cadence detection, where cadences can be any pattern up to a particular limited length of observation window. In one exemplary embodiment, if is it observed that there is a pattern to frame duration including: duration1 for frame1, duration1 for frame 2, duration2 for frame3, duration1 for frame 4, duration1 for frame 5, duration2 for frame 6, the estimated_frame_ duration(t) may be predicted based on this observed cadence.

Further, as shown in operation 906, the modified value of the pixel is transmitted to the display screen for display thereof. The modification of the value of the pixel may result in a pixel value that is capable of achieving a desired luminance value at a particular point in time. For example, the display screen may require a particular amount of time from scanning a value of a pixel to actually achieving a correct intensity for the pixel in a manner such that a viewer observes the correct intensity for the pixel. In other words, the display screen may require a particular amount of time to achieve the desired luminance of the pixel. In some cases, the display screen may not be given sufficient time to achieve the desired luminance of the pixel, such as when a next value of the pixel is transmitted to the display screen for display thereof before the display screen has reached the initial desired luminance.

Thus, an initial value of a pixel to be displayed by the display screen may be modified in the manner described above with respect to operation 904 to allow the display screen to reach the initial value of the pixel within the time given. In one exemplary embodiment, a first value (first luminance) of a pixel included in one image frame may be different from a second value (second luminance) of the pixel included in a subsequent image frame. A display screen to be used for displaying the image frames may require a particular amount of time to transition from displaying the first pixel value to displaying the second pixel value. If that particular amount of time is not given to the display screen, the second pixel value may be modified to result in a greater difference between the first pixel value and the second pixel value, thereby driving the display screen to reach the desired second pixel value in less time.

Figure 10:
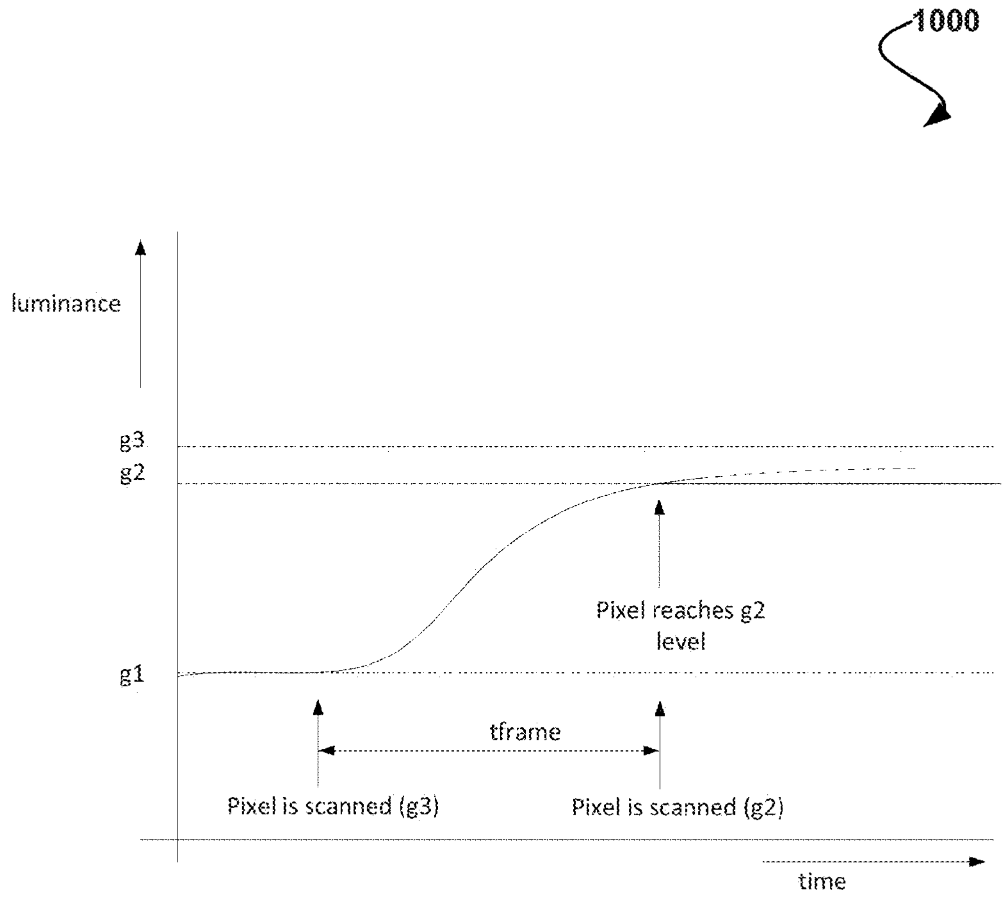
FIG. 10 shows a graph of a resulting luminance when a pixel value is modified as a function of a display duration estimate and is displayed during that display duration estimate, in accordance with yet another embodiment.

FIG. 10 shows a graph 1000 of a resulting luminance when a pixel value is modified as a function of a display duration estimate and is displayed during that display duration estimate, in accordance with yet another embodiment. As an option, the graph 1000 may represent an implementation of the method 900 of FIG. 9 when a pixel value is modified as a function of a display duration estimate and is displayed during that display duration estimate.

As shown, a pixel included in a plurality of image frames is initially given a sequence of gray values respective to those image frames including g1, g1, g1, g2, g2, g2. The display screen may be capable of achieving the initial pixel values within the estimated given time durations, with the exception of the first instance of the g2 value. In particular, the duration of time estimated to be given to the display screen to display the first instance of the g2 value may be less than a required time for the display screen to transition from the g1 value to the desired g2 value.

Accordingly, the first instance of the g2 value given to the pixel may be modified to be the value g3 (having a greater difference from g1 than between g1 and g2). Thus, the actual pixel values transmitted to the display screen are g1, g1, g1, g3, g2, g2. As shown on the graph 1000, when value g3 is scanned, the luminance of the pixel increases on the display screen, such that by the time the display screen receives an update to the pixel value (i.e. the first g2 of the transmitted pixel values), the display screen has reached the value g2 which was the initially desired value prior to the modification.

Figure 11:
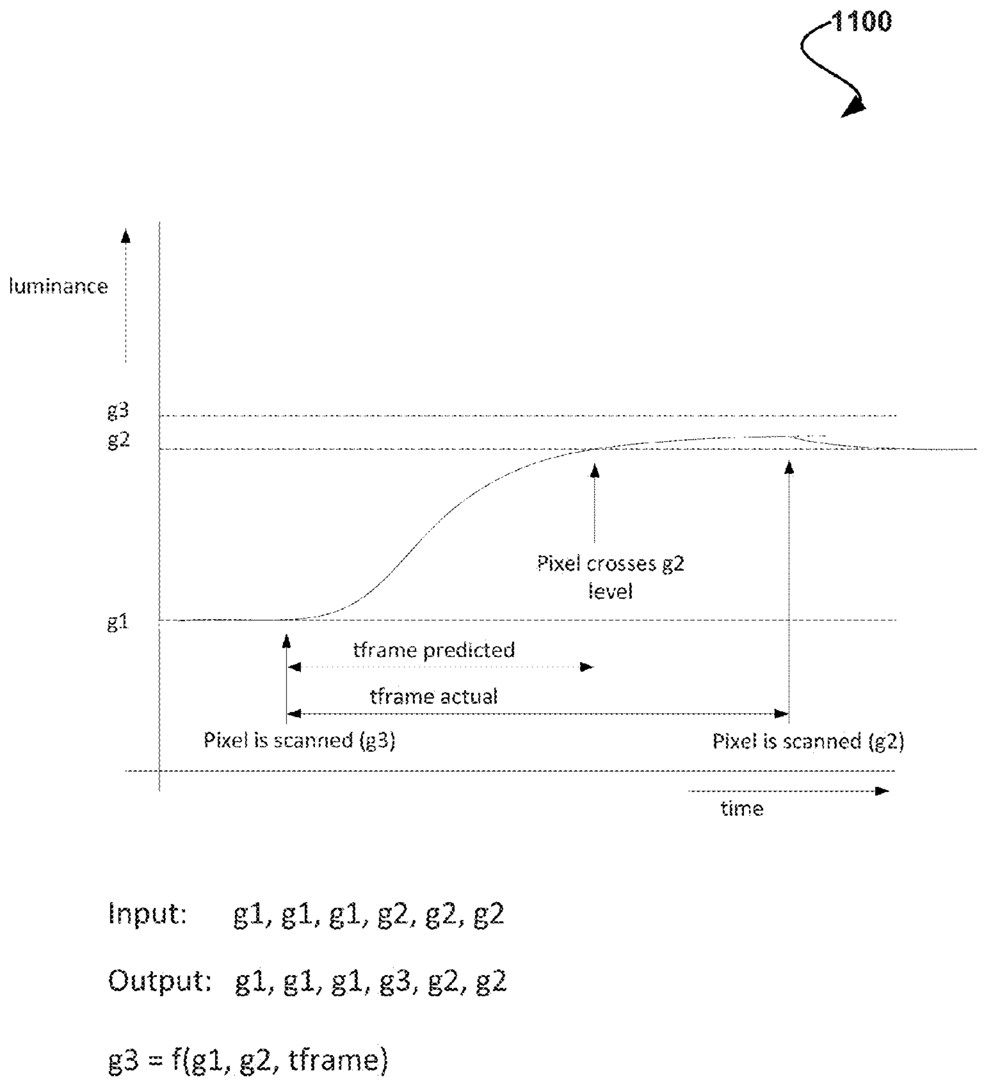
FIG. 11 shows a graph of a resulting luminance when a pixel value is modified as a function of a display duration estimate and is displayed longer than that display duration estimate, in accordance with still yet another embodiment.

FIG. 11 shows a graph 1100 of a resulting luminance when a pixel value is modified as a function of a display duration estimate and is displayed longer than that display duration estimate, in accordance with still yet another embodiment. As an option, the graph 1100 may represent an implementation of the method 900 of FIG. 9 when a pixel value is modified as a function of a display duration estimate and is displayed longer than that display duration estimate.

Similar to FIG. 10, FIG. 11 includes an initially desired sequence of values for a pixel that includes g1, g1, g1, g2, g2, g2, where the actual values for the pixel transmitted to the display screen include g1, g1, g1, g3, g2, g2. When value g3 is scanned, the luminance of the pixel increases on the display screen. In FIG. 11, the update to the pixel is received by the display device later than had been estimated, such that the luminance of the pixel increases past the value g2 (which was the initially desired value prior to the modification) such that the area under the shown curve when the back-light of the display device is on is too high, so the perceived luminance is too high. In this way, perceived luminance for the pixel is undesired.

For a 2D display device, this error potentially resulting from the aforementioned modification is not fatal. If the resulting pixel value is incorrect, for example causing a luminance overshoot, there may be a faint visual artifact along the leading and or trailing edge of a moving object. Furthermore, in general when the estimated duration of display is determined from a duration of display of a previous image frame, the error will be minimal since typically an application generating the image frames has a fairly regular refresh rate.

For a stereoscopic 3D display device (time sequential), the use of the more exact amount of modification to the value of the pixel may be essential. Errors may cause ghosting/crosstalk between the eyes. So the method 900 of FIG. 9 may not be desired. For this reason 3D monitors may not use the dynamic refresh concept with arbitrary duration vertical blanking interval in conjunction with the method 900 of FIG. 9. Instead, the 3D display device may either use fixed refresh rate approach or the below described 'adaptive variable refresh rate' approach.

Adaptive Variable Refresh Rate

A display device may be capable of handling many refresh rates, each with input timings normal style, for example: 30 Hz, 40 Hz, 50 Hz, 60 Hz, 72 Hz, 85 Hz, 100 Hz, 120 Hz, etc.

The GPU may initially render at, for example, a 85 Hz refresh rate. It then finds that it is actually not able to sustain rendering at 85 Hz, and it gives the monitor a special warning message, for example a MCCS command over i2c that it will change, for example to 72 Hz. It sends this message right before changing to the new timing. The GPU may do for example, 100 frames at 85 Hz, warn 72, 200 frames at 72 Hz, warn 40, 500 frames at 40 Hz, warn 60, 300 frames at 60 Hz, etc. Because the scaler is warned ahead of time about the transition, the scaler is better able to make a smooth transition without going through a normal mode change (e.g. to avoid black screen, corrupted frame, etc.).

For a 120 Hz refresh rate capable monitor, some extra horizontal blanking or vertical blanking may be provided in the low refresh rate timings to make sure that the DVI always runs in dual-link mode and to avoid link switching, which is also similar on DP.

This 'adaptive variable refresh rate' monitor may be able to achieve the goal of running well in cases where the GPU is rendering just below 60 Hz without the effect of dropping to 30 Hz such as with regular monitor and 'vsync-on'. However, this monitor may not necessarily respond well to games that have highly variable frame render time.

Figure 12:
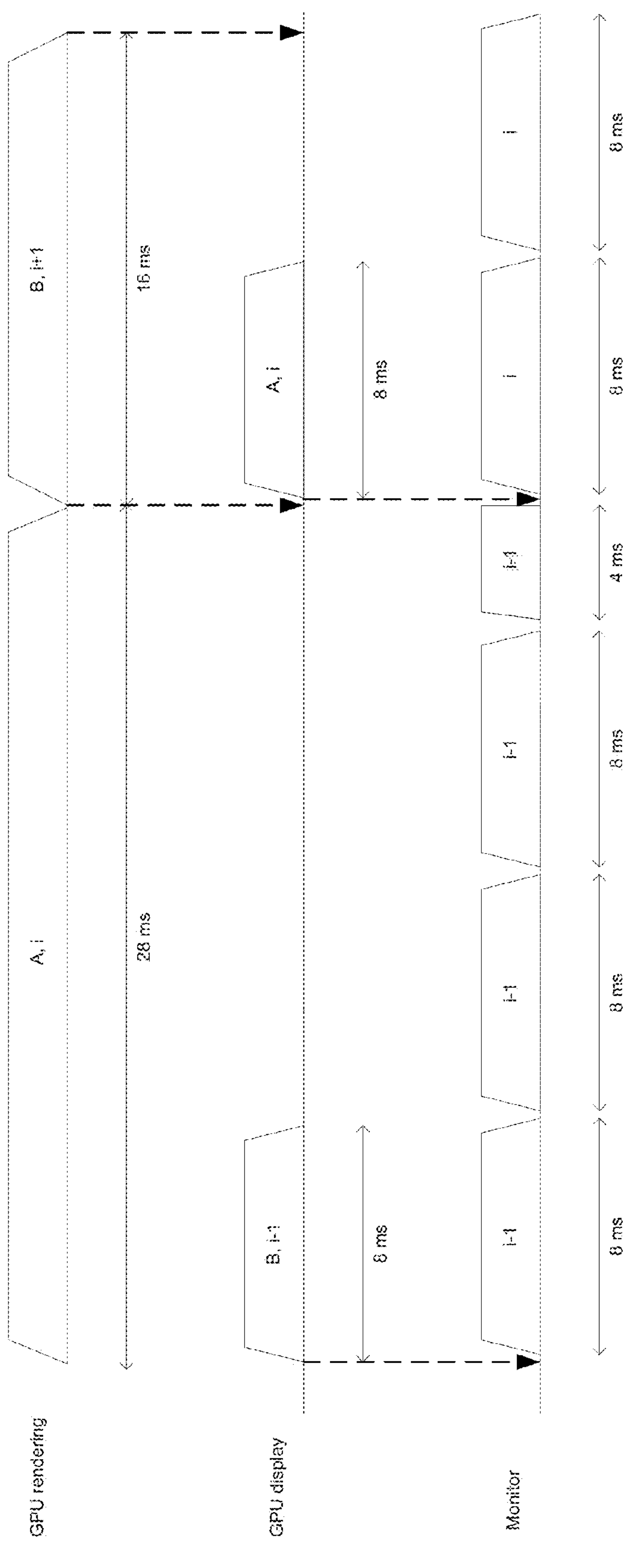
FIG. 12 shows a timing diagram relating operation of a system having a dynamic display refresh in which image repetition is automated by a display device capable of interrupting display of a repeat image frame to display a next image frame starting at a first scan line of a display screen of the display device, in accordance with another embodiment.
Figure 13:
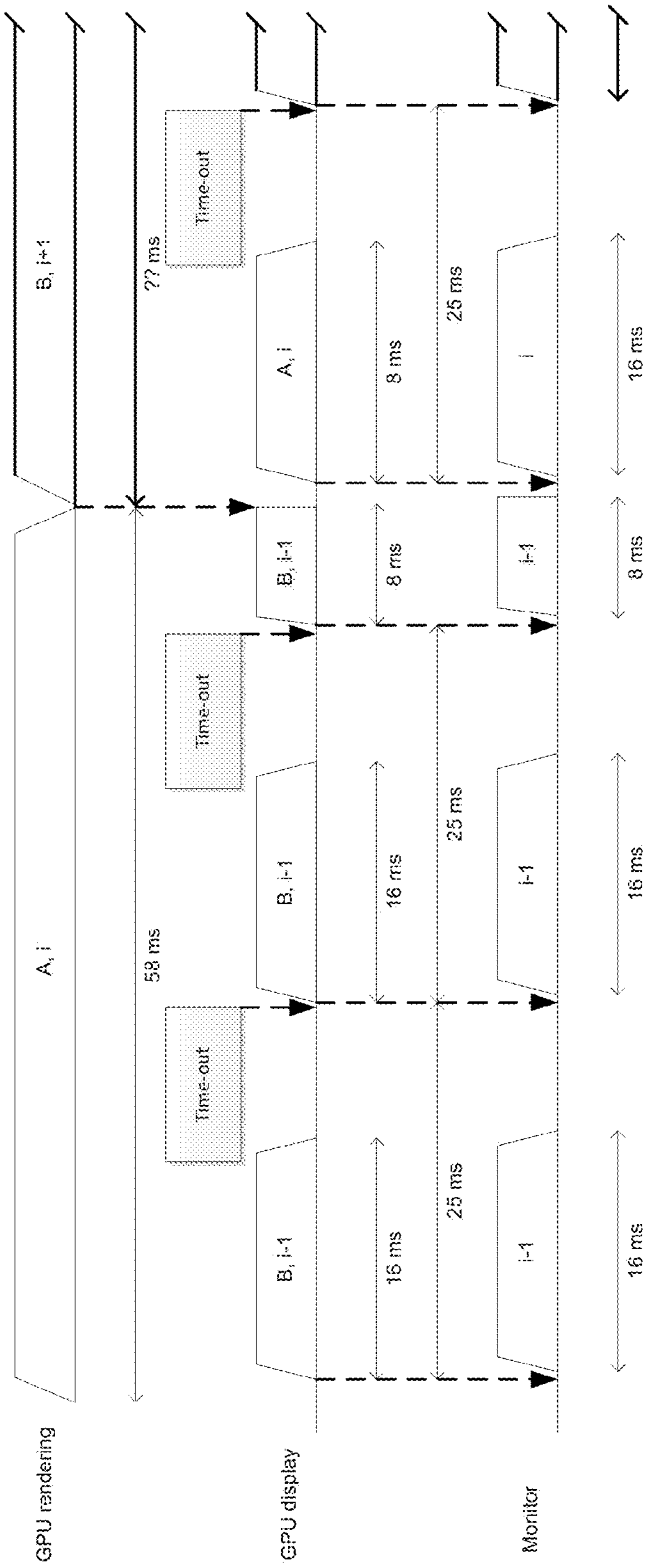
FIG. 13 shows a timing diagram relating to operation of a system having a dynamic display refresh in which image repetition is automated by a GPU capable of causing interruption of a display by a display device of a repeat image frame to display a next image frame starting at a first scan line of a display screen of the display device, in accordance with another embodiment.

FIGS. 12-13 show examples of operation where image repetition is automated and the display device is capable of interrupting painting of a repeated image frame on a display screen of the display device to begin painting of the next image frame on a first line of the display screen of the display device. In particular, in the case where the display device can handle interrupting painting of one image frame on the display screen to begin painting of a next image frame on a first line of the display screen (i.e. aborting and rescanning), the delaying of the refresh of the display device may be performed by a graphics processing unit and further image frames can be automatically repeated by the display device at a preconfigured frequency (e.g. 40 Hz) until the next image frame is rendered in its entirety and thus transmitted to the display device for display thereof. This automated repeating of image frames may avoid the low frequency flicker issues that occur at 20-30 Hz altogether.

FIG. 12 shows a timing diagram relating operation of a system having a dynamic display refresh in which image repetition is automated by a display device capable of interrupting display of a repeat image frame to display a next image frame starting at a first scan line of a display screen of the display device. The embodiment of FIG. 12 may apply to either a monitor with a scaler that initiates the repeats, or to an LCD panel for tablets, phones or Notebooks, where there is no scaler but there is a TCON capable of self-refresh. In order to avoid flicker, the display screen automatically repeats a last received image frame at some rate (shown at 120 Hz, but it could also be lower, like 40 or 50 Hz). Further, to avoid any delay caused by such frequent repeats, the display device does the abort/re-scan as soon as the next image frame is rendered in its entirety and thus ready for display. As shown, when consistently refreshing at 120 Hz, for example, the display device may always end up aborting/rescanning in order to display the next image frame. If the automated repeat occurs at for example 40 or 50 Hz, the abort/rescan may or may not occur in order to display the next image frame. In either case, there will never be delay between completion of rendering an image frame and the start of scanning that image frame to the display.

FIG. 13 shows a timing diagram relating to operation of a system having a dynamic display refresh in which image repetition is automated by a GPU capable of causing interruption of a display by a display device of a repeat image frame to display a next image frame starting at a first scan line of a display screen of the display device. The GPU initiates the repeats, which are shown at approximately 40 Hz, but could be done at any higher or lower rate specific to the display screen to avoid flicker. As shown, the GPU initiates the repeats with some delay in between (i.e. per the timeout), and in any case when a next image is rendered in its entirety, the GPU aborts the scanout in progress, and indicates the same to the display device which starts anew scanout of the next image.

Figure 14:
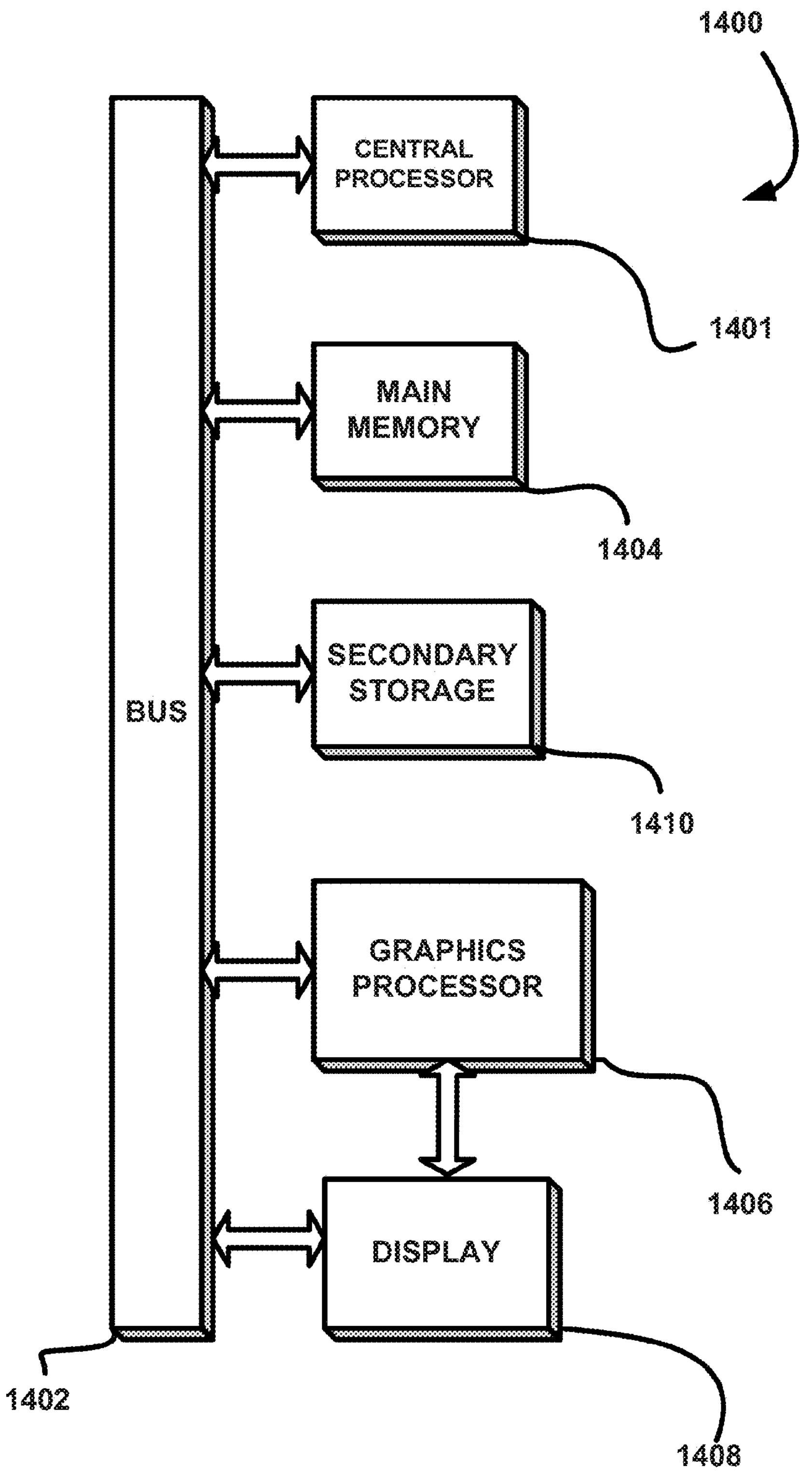
FIG. 14 illustrates an exemplary system in which the various architecture and/or functionality of the various previous embodiments may be implemented.

FIG. 14 illustrates an exemplary system 1400 in which the various architecture and/or functionality of the various previous embodiments may be implemented. As shown, a system 1400 is provided including at least one host processor 1401 which is connected to a communication bus 1402. The system 1400 also includes a main memory 1404. Control logic (software) and data are stored in the main memory 1404 which may take the form of random access memory (RAM).

The system 1400 also includes a graphics processor 1406 and a display 1408, i.e. a computer monitor. In one embodiment, the graphics processor 1406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1400 may also include a secondary storage 1410. The secondary storage 1410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1404 and/or the secondary storage 1410. Such computer programs, when executed, enable the system 1400 to perform various functions. Memory 1404, storage 1410 and/or any other storage are possible examples of computer-readable media.

In one embodiment, the architecture and/or functionality of the various previous figures may be implemented in the context of the host processor 1401, graphics processor 1406, an integrated circuit (not shown) that is capable of at least a portion of the capabilities of both the host processor 1401 and the graphics processor 1406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1400 may take the form of a desktop computer, lap-top computer, and/or any other type of logic. Still yet, the system 1400 may take the form of various other devices m including, but not limited to a personal digital assistant (PDA) device, a mobile phone device, a television, etc.

Further, while not shown, the system 1400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

performing a first refresh of a display device during which a screen of the display device is painted line-by line with an image frame to emit photons, wherein the image frame is transmitted from a first buffer in a memory;

identifying a state of the display device at a point in time when the entirety of the image frame is displayed by the screen of the display device;

in response to the identification of the state, determining that an entirety of a next image frame to be displayed has not been rendered to a second buffer in the memory by a processor; and in response to the determining that the entirety of the next image frame to be displayed has not been rendered to the second buffer, delaying a second refresh of the display device while the next image frame continues to be rendered to the second buffer, wherein delaying the second refresh of the display device comprises preventing the screen of the display device from being re-painted line-by line to emit photons.

2. The method of claim 1, wherein the state of the display device at a point in time when the entirety of the image frame is displayed by the screen of the display device is identified in response to completion of a last scan line of the screen of the display device being painted.

3. The method of claim 1, wherein in response to the identification of the state, the next image frame is transmitted to the display device for display thereof as fast as possible upon the determination that the entirety of the next image frame to be displayed has been rendered to the second buffer.

4. The method of claim 1, wherein the second refresh of the display device is delayed up to a threshold amount of time.

5. The method of claim 4, further comprising, after the second refresh is delayed up to the threshold amount of time, painting the screen of the display device with the image frame.

6. The method of claim 5, wherein the painting of the screen of the display device with the image frame is performed by the processor re-transmitting the image frame from the first buffer to the display device.

7. The method of claim 5, wherein the painting of the screen of the display device with the image frame is performed by the display device displaying the image frame from a buffer internal to the display device.

8. The method of claim 5, further comprising, waiting for the entirety of the repeated image frame to be displayed by the display device before transmitting the next image frame to the display device for display thereof.

9. The method of claim 5, further comprising, when the entirety of the next image frame to be displayed has been rendered to the second buffer before an entirety of the repeated image frame is displayed by the screen of the display device, transmitting the next image frame to the display device for display thereof without identifying a state of the display device at a point in time when the entirety of the repeated image frame is displayed by the screen of the display device.

10. The method of claim 9, wherein upon receipt of the next image frame by the display device, the display device interrupts the painting of the screen of the display device with the image frame and begins painting of the screen of the display device with the next image frame at a point of the interruption, resulting in simultaneous display by the screen of the display device of a portion of the image frame and a portion of the next image frame.

11. The method of claim 5, wherein upon receipt of the next image frame by the display device, the display device interrupts the painting of the screen of the display device with the image frame and begins painting of the screen of the display device with the next image frame at a first scan line of the screen of the display device.

12. The method of claim 4, further comprising, after the second refresh is delayed up to the threshold amount of time, transmitting the next image frame to the display device for display thereof.

13. The method of claim 4, wherein the threshold amount of time is specific to a model of the display device.

14. The method of claim 4, wherein the second refresh of the display device is delayed by one of:

waiting up to a predetermined period of time before transmitting any further image frames to the display device; or instructing the display device to ignore an unwanted image frame transmitted to the display device when the processor will not wait up to the predetermined period of time before transmitting any further image frames to the display device.

15. The method of claim 1, wherein smoothness of motion for moving objects is provided via a constant delay between completion of rendering of a first image frame and painting of a second image frame to the screen of the display device.

16. The method of claim 1, wherein an amount of system power used is reduced when the second refresh of the display device is delayed.

17. The method of claim 1, wherein the processor is a graphics processing unit (GPU).

18. The method of claim 1, wherein the display device is a stereo display device displaying image frames having both left content intended for viewing by a left eye of a viewer and right content intended for viewing by a right eye of the viewer.

19. The method of claim 1, wherein the delaying of the second refresh of the display device is performed by the processor, and during the delay the display device automatically repeats display of the image frame at a preconfigured frequency until the next image frame is transmitted to the display device.

20. The method of claim 1, wherein the screen of the display device comprises a touch screen.

21. The method of claim 1, wherein a pixel of the screen of the display device is allowed to change in color or brightness compared with a value of the pixel in the image frame while the second refresh is delayed.

22. A computer program product embodied on a non-transitory computer readable medium, comprising:

computer code for performing a first refresh of a display device during which a screen of the display device is painted line-by line with an image frame to emit photons, wherein the image frame is transmitted from a first buffer in a memory;

computer code for identifying a state of the display device at a point in time when the entirety of the image frame is displayed by the screen of the display device;

computer code for, in response to the identification of the state, determining that an entirety of a next image frame to be displayed has not been rendered to a second buffer in the memory by a processor; and computer code for in response to the determining that the entirety of the next image frame to be displayed has not been rendered to the second buffer, delaying a second refresh of the display device while the next image frame continues to be rendered to the second buffer, wherein delaying the second refresh of the display device comprises preventing the screen of the display device from being re-painted line-by line to emit photons.

23. The computer program product of claim 22, wherein a pixel of the screen of the display device is allowed to change in color or brightness compared with a value of the pixel in the image frame while the second refresh is delayed.

24. An apparatus, comprising:

a memory comprising a first buffer and a second buffer; and at least one processor for:

performing a first refresh of a display device during which a screen of the display device is painted line-by line with an image frame to emit photons, wherein the image frame is transmitted from the first buffer;

identifying a state of a display device at a point in time when the entirety of the image frame is displayed by the screen of the display device;

in response to the identification of the state, determining that an entirety of a next image frame to be displayed has not been rendered to the second buffer; and in response to the determining that the entirety of the next image frame to be displayed has not been rendered to the second buffer, delaying a second refresh of the display device while the next image frame continues to be rendered to the second buffer, wherein delaying the second refresh of the display device comprises preventing the screen of the display device from being re-painted line-by line to emit photons the image frame.

25. The apparatus of claim 24, wherein the processor remains in communication with the memory and the display device via a bus.

26. The apparatus of claim 24, wherein a pixel of the screen of the display device is allowed to change in color or brightness compared with a value of the pixel in the image frame while the second refresh is delayed.

* * * * *